(12) United States Patent
Konno et al.

(10) Patent No.: US 8,218,216 B2
(45) Date of Patent: Jul. 10, 2012

(54) IMAGE PROJECTOR

(75) Inventors: Kenji Konno, Sakai (JP); Kenji Mizumoto, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 937 days.

(21) Appl. No.: 12/056,564

(22) Filed: Mar. 27, 2008

(65) Prior Publication Data

US 2008/0239252 A1 Oct. 2, 2008

(30) Foreign Application Priority Data

Mar. 29, 2007 (JP) .................................. 2007-087702

(51) Int. Cl.
G02B 26/10 (2006.01)

(52) U.S. Cl. .................. 359/202.1; 359/224.1; 359/904; 353/39

(58) Field of Classification Search .... 359/198.1–199.4, 359/200.6–200.8, 202.1, 221.2, 223.1–225.1, 359/226.2, 290–295, 838, 846, 871, 872; 250/204, 559.06, 559.29, 230, 234; 347/255–260; 353/39, 98–99; 385/15–18, 22; 398/12, 398/19, 45

See application file for complete search history.

(56) References Cited

U.S. PATENT DOCUMENTS

2004/0085617 A1* 5/2004 Helsel et al. .................. 359/292
2006/0181756 A1* 8/2006 Yamazaki ..................... 359/212

FOREIGN PATENT DOCUMENTS

JP 2006-178346 A 7/2006

OTHER PUBLICATIONS

Miklos Stern et al, "73.3: Ultra-Miniature Projector: A High Resolution, Battery Powered Laser Display", SID 06 DIGEST, pp. 2015-2017.

* cited by examiner

Primary Examiner — Jennifer L Doak
(74) Attorney, Agent, or Firm — Cozen O'Connor

(57) ABSTRACT

An object of the present invention is to provide an image projector capable of projecting a high-quality image while realizing small size. In the image projector, a light flux is deflected two-dimensionally by turning a reflector for reflecting a light flux emitted from a light source around a second axis almost orthogonal to a first axis as a center by resonant drive while turning the reflector around the first axis as a center by non-resonant drive. Shape of one or more optical surfaces of a projection optical system for projecting an image onto a projection plane by guiding light onto the projection plane includes a shape for performing a correction for maintaining scanning speed of the light flux along one scan direction on the projection plane almost constant and a shape for performing a correction for suppressing a distortion in an image along the other scan direction almost orthogonal to the one scan direction on the projection plane. By controlling turn of the reflector, at least one of a correction for maintaining scanning speed of the light flux along the other scan direction on the projection plane almost constant and a correction for suppressing a distortion in an image along the one scan direction on the projection plane is performed.

11 Claims, 19 Drawing Sheets

F I G . 1
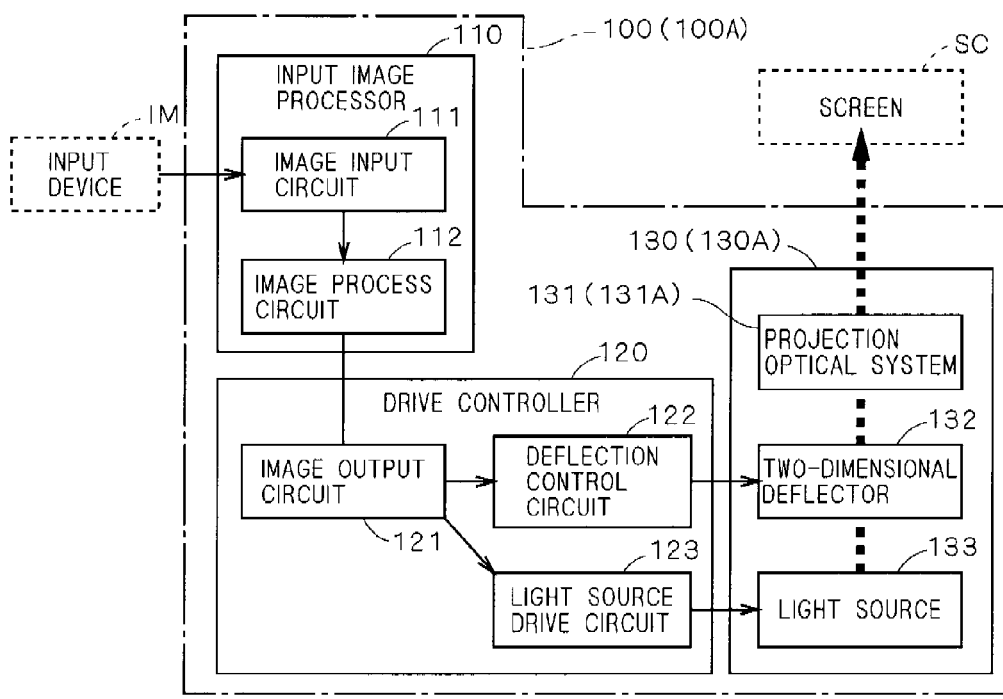

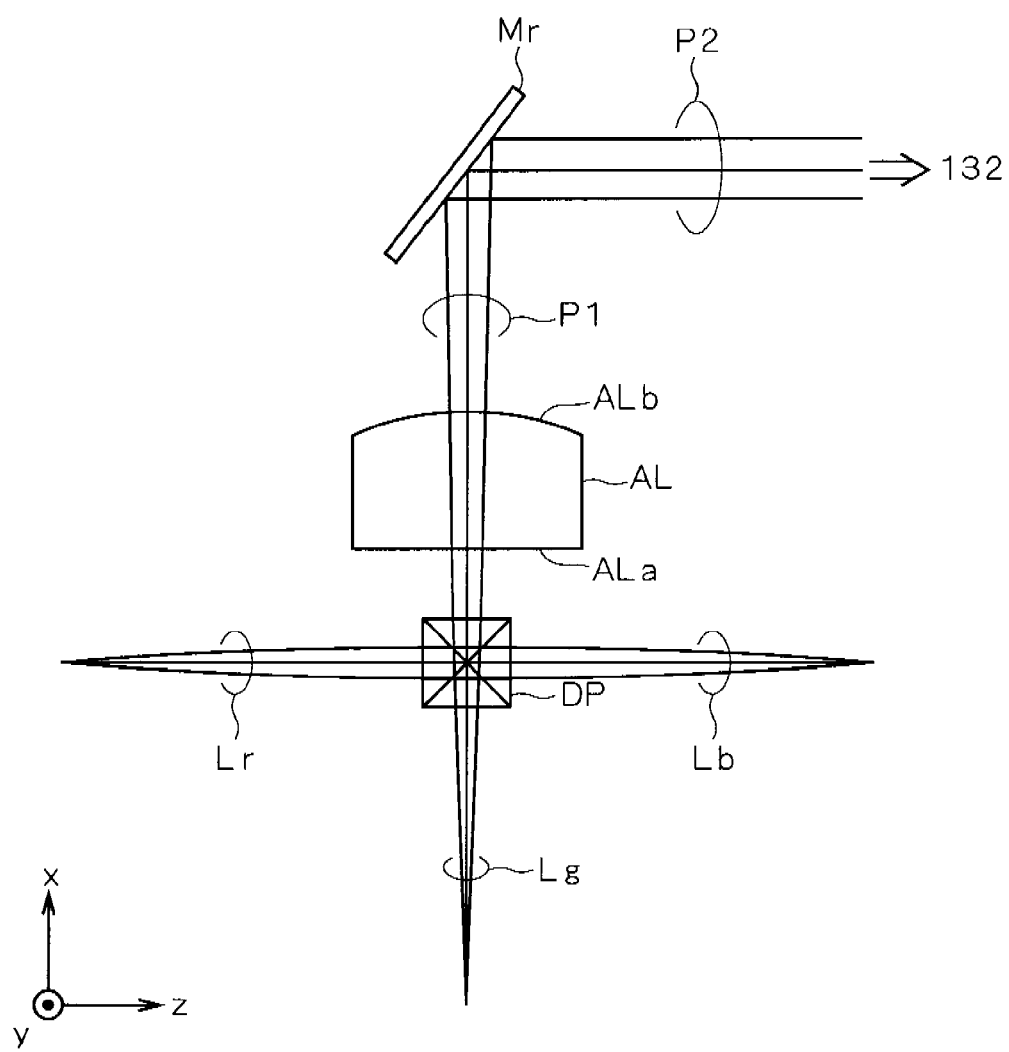

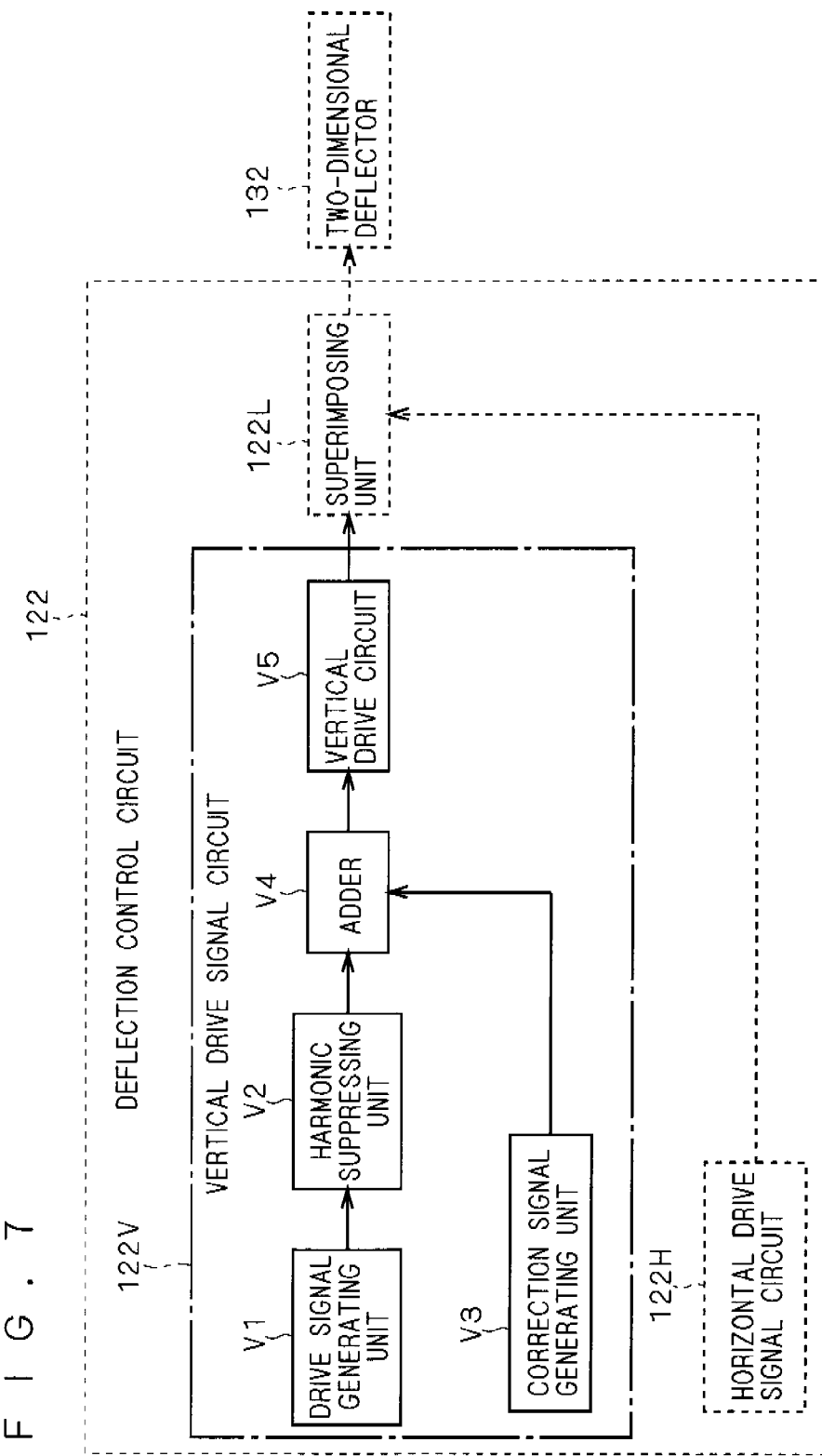

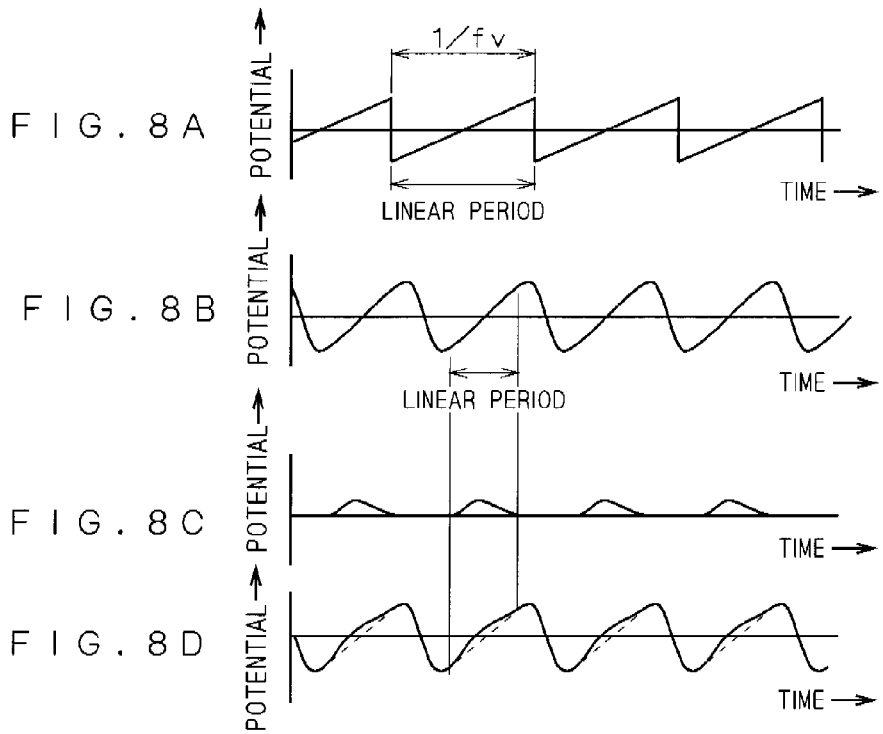
FIG. 8A
FIG. 8B
FIG. 8C
FIG. 8D
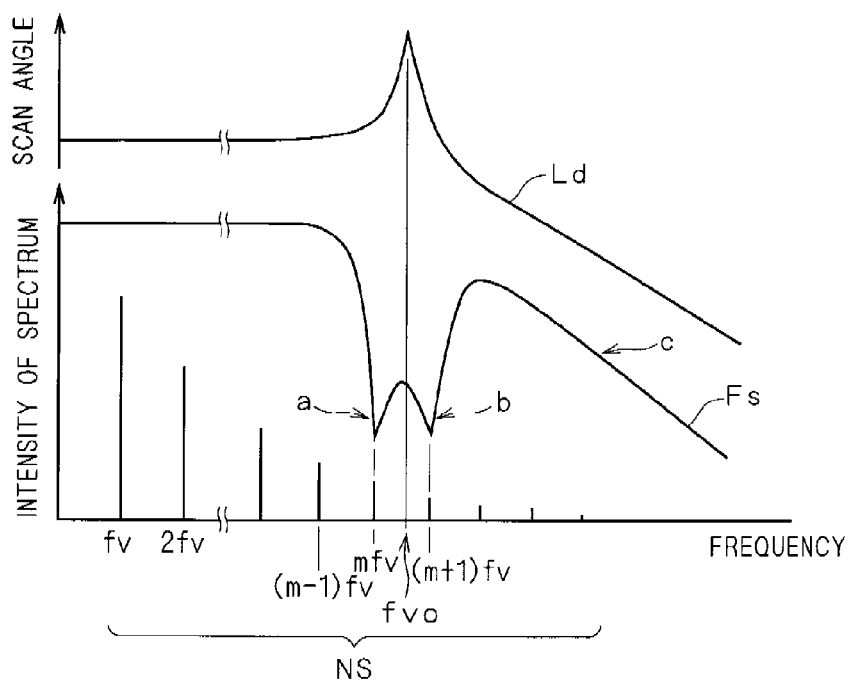
FIG. 9

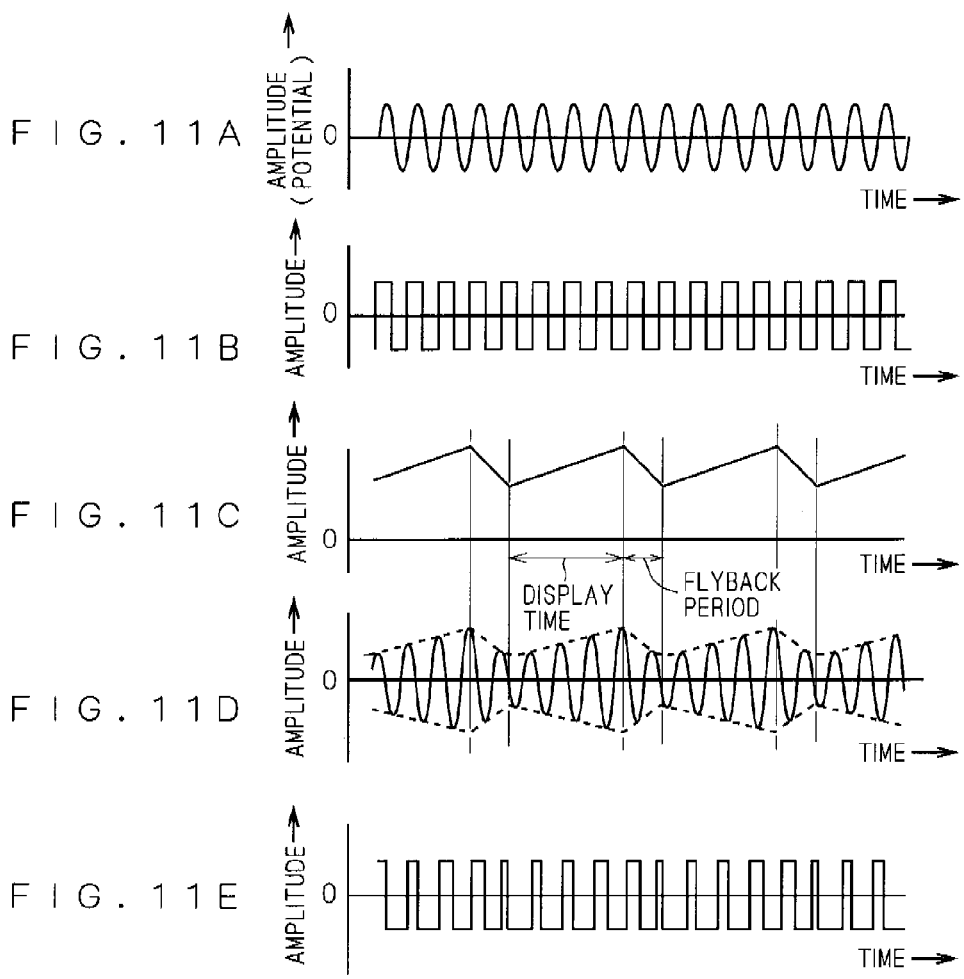
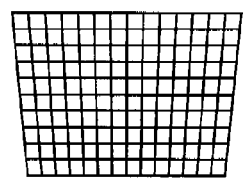 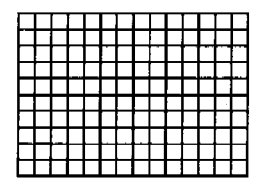

FIG. 15

|  | FLUCTUATIONS IN SCAN SPEED | DISTORTION |
|---|---|---|
| HORIZONTAL SCAN | OPTICAL CORRECTION | DEFLECTION SCAN DRIVE CORRECTION |
| VERTICAL SCAN | DEFLECTION SCAN DRIVE CORRECTION | OPTICAL CORRECTION |

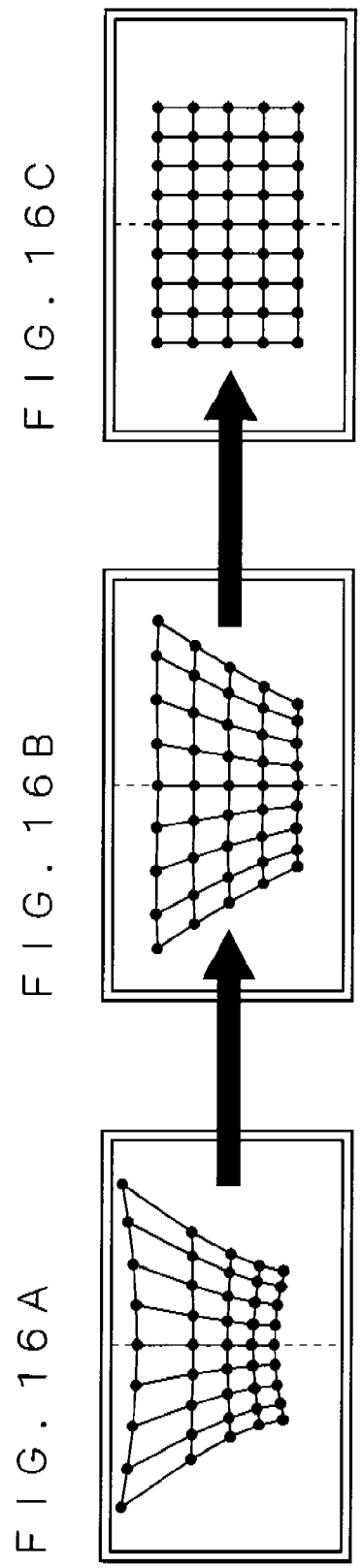

F I G . 1 7
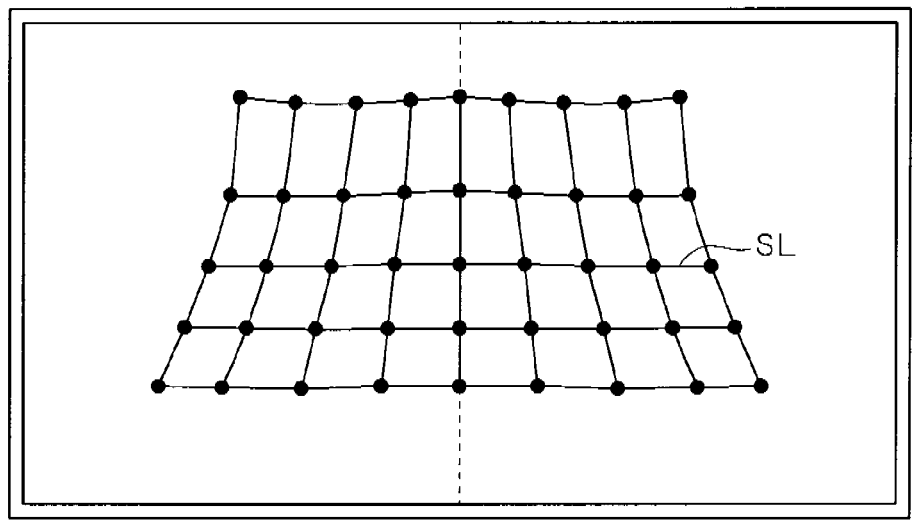
F I G . 1 8
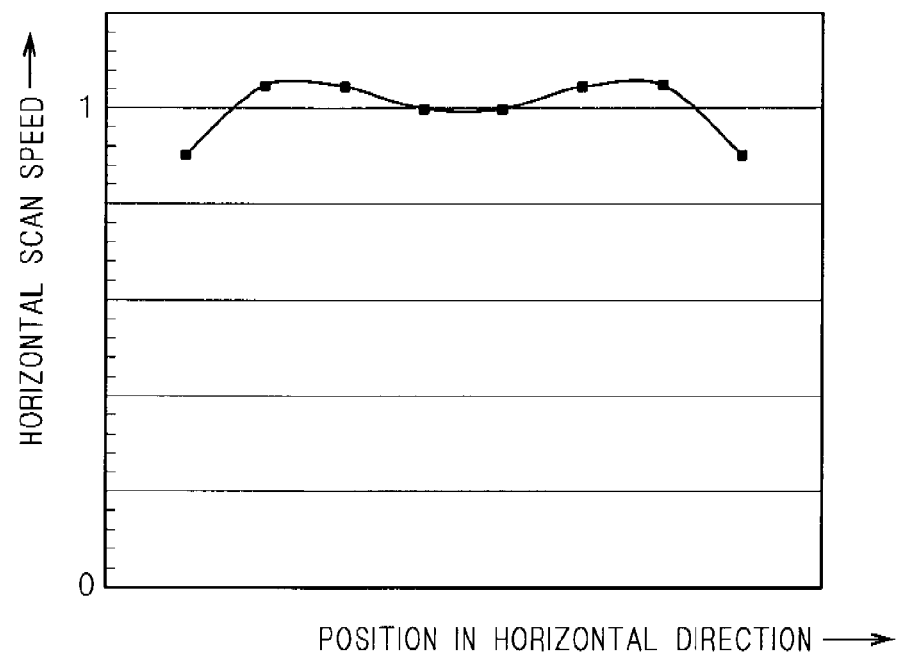

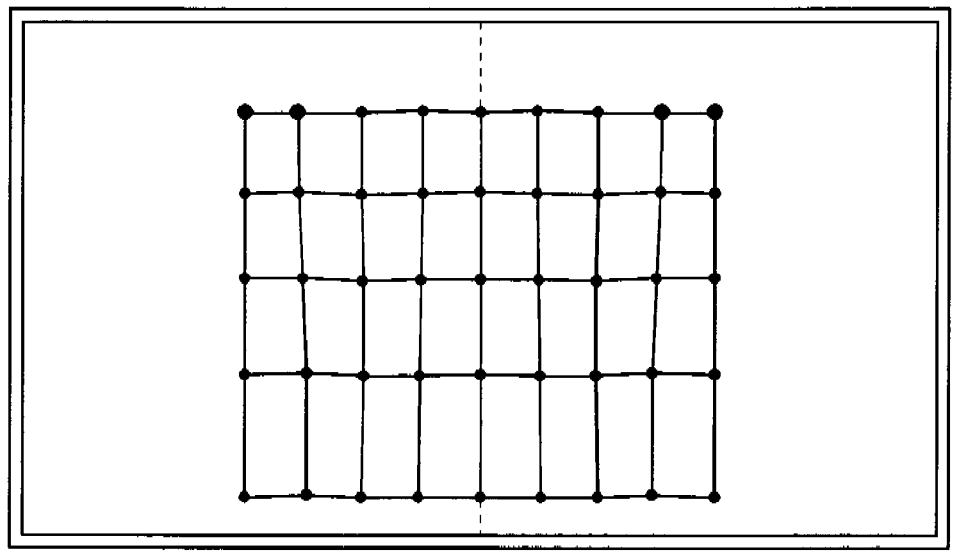

IMAGE PROJECTOR

This application claims priority on application No. 2007-087702 filed in Japan, the contents of which are hereby incorporated by reference.

BACKGROUND OF THE INVENTION

1. Field of the Invention

The present invention relates to an image projector for projecting an image to a projection plane. More particularly, the invention relates to, especially, an optical system of a small-sized image projector for projecting an image by two-dimensionally deflecting and scanning light. More specifically, the invention relates to a so-called optical engine part of a small size in, for example, a pocket projector, a data projector, a rear projection television, or the like.

2. Description of the Background Art

Various small-sized image projectors for two-dimensionally deflecting and scanning light from a light source and projecting an image are proposed (for example, Japanese Patent Application Laid-Open No. 2006-178346 and SID 06 DIGEST, pp. 2015-2017, 73.3). As means for two-dimensionally deflecting light (light scanning means), a galvanometer mirror or a so-called MEMS (Micro Electro Mechanical Systems) mirror is used.

In such an image projector, to project a dynamic image on a large screen, the galvanometer mirror or MEMS mirror has to be driven at high speed and with large amplitude (mechanical deflection angle). For example, a system of drive using resonance (resonant drive) is employed.

However, it is known that, in the case of employing the resonant drive, the scanning speed largely drops at both ends of an amplitude, that is, at the maximum and minimum values of the amplitude, in other words, in peripheral parts of an image. It is also known as a general problem that, due to such a phenomenon, brightness in peripheral parts of a screen becomes higher than that in the center of the screen and, when the modulation speed of the light source is constant, a difference occurs between the resolution in the center of the screen and the resolution in a peripheral part of the screen. It is also known as another general problem that, when a projection method of projecting an image onto a projection plane (for example, a screen) from an oblique direction is considered, an image projected onto the projection plane (projected image) is distorted in a trapezoidal shape.

To address such problems, a method is considered in which a correction is excellently performed by using an optical system so as to achieve constant speed of a light flux emitted to a projection plane (for example, a screen) in order to suppress variations in brightness and resolution by employing deflection scanning means using a mirror of a resonant drive system. An optical scanning device has been proposed, that corrects fluctuations in scan speed and a distortion in an image by using a projection optical system provided with the so-called f-arcsine characteristic and including a combination of two mirrors and a single refractive lens or a combination of three mirrors (for example, Japanese Patent Application Laid-Open No. 2006-178346). A technique of correcting fluctuations in scan speed and a distortion in an image by using an image process has been also proposed (for example, SID 06 DIGEST, pp. 2015-2017, 73.3).

In the technique of Japanese Patent Application Laid-Open No. 2006-178346, fluctuations in scan speed and a distortion in a projected image are corrected in an apparatus using an MEMS mirror for two-dimensionally deflecting and scanning light. Problems caused by the driving method and the projecting method of the MEMS mirror are corrected by an optical system (projecting optical system) for projecting light deflected by the MEMS mirror onto a projection plane. Consequently, it causes enlargement in the size of the projecting optical system and the image projector. That is, when resonant drive in the direction along the horizontal scan line (the lateral direction) and linear drive in the vertical direction are corrected only by the projecting optical system while using the MEMS mirror, the projecting optical system is complicated, and the size of the projecting optical system is enlarged. Therefore, although miniaturization is originally aimed, the apparatus is enlarged, and it can be said that needs are not responded properly. When problems caused by the driving method and the projecting method of the MEMS mirror are corrected by using an image process like the technique of SID 06 DIGEST, pp. 2015-2017, 73.3, the angle used for deflection of light and projection decreases in the mechanical deflection angle of the MEMS mirror. Therefore, deterioration in the so-called duty causes decrease in brightness of an image, that is, deterioration in picture quality.

SUMMARY OF THE INVENTION

The present invention is directed to an image projector for projecting an image onto a projection plane.

According to the present invention, the image projector includes: a light source; a deflector having a reflector for reflecting a light flux emitted from the light source and two-dimensionally deflecting the light flux by turning the reflector around a first axis as a center and turning the reflector around a second axis as a center, the second axis almost orthogonal to the first axis; a deflection controller for controlling the reflector so as to be turned around the second axis as a center by resonant drive and so as to be turned around the first axis as a center by non-resonant drive; and a projection optical system for projecting the image onto the projection plane by guiding the light flux deflected by the deflector onto the projection plane. Shape of one or more optical surfaces of the projection optical system includes a shape for performing a one-scan-direction scan speed correction for maintaining scanning speed of the light flux along one scan direction on the projection plane almost constant and a shape for performing an other-scan-direction distortion correction for suppressing a distortion in an image along the other scan direction almost orthogonal to the one scan direction on the projection plane. The deflection controller performs at least one of an other-scan-direction scan speed correction for maintaining scanning speed of the light flux along the other scan direction on the projection plane almost constant by controlling turn of the reflector around the first axis as a center, and a one-scan-direction distortion correction for suppressing a distortion in an image along the one scan direction on the projection plane by controlling turn of the reflector around the second axis as a center.

Without causing enlargement of the projection optical system and deterioration in brightness of an image, assurance of constant speed in the scan of a light flux and suppression of a distortion in an image can be achieved. Therefore, the invention can provide the image projector capable of projecting a high-quality image while realizing small size.

According to another aspect of the invention, an image projector includes: a light source; a deflector having first and second reflectors for sequentially reflecting a light flux emitted from the light source, and two-dimensionally deflecting the light flux by turning the first reflector around a first axis as a center and turning the second reflector around a second axis as a center, the second axis apart from the first axis as a reference by a predetermined distance along a predetermined straight line almost orthogonal to the first axis and rotated by almost 90° around the predetermined straight line as a center; a deflection controller for controlling the second reflector so as to be turned around the second axis as a center by resonant drive and controlling the first reflector so as to be turned around the first axis as a center by non-resonant drive; and a projection optical system for projecting the image onto the projection plane by guiding the light flux deflected by the deflector onto the projection plane. Shape of one or more optical surfaces of the projection optical system includes a shape for performing a one-scan-direction scan speed correction for maintaining scanning speed of the light flux along one scan direction on the projection plane almost constant and a shape for performing an other-scan-direction distortion correction for suppressing a distortion in an image along the other scan direction almost orthogonal to the one scan direction on the projection plane. The deflection controller performs at least one of an other-scan-direction scan speed correction for maintaining scanning speed of the light flux along the other scan direction on the projection plane almost constant by controlling turn of the first reflector around the first axis as a center, and a one-scan-direction distortion correction for suppressing a distortion in an image along the one scan direction on the projection plane by controlling turn of the second reflector around the second axis as a center.

Without causing enlargement of the projection optical system and deterioration in brightness of an image, assurance of constant speed in the scan of a light flux and suppression of a distortion in an image can be achieved. Therefore, the invention can provide the image projector capable of projecting a high-quality image while realizing small size.

Further, according to another aspect of the present invention, an image projector includes: a light source; a deflector having a reflector for reflecting a light flux emitted from the light source and two-dimensionally deflecting the light flux by turning the reflector around a first axis as a center and turning the reflector around a second axis as a center, the second axis almost orthogonal to the first axis; a deflection controller for controlling the reflector so as to be turned around the first axis as a center and so as to be turned around the second axis as a center; and a projection optical system for projecting the image onto the projection plane by guiding the light flux deflected by the deflector onto the projection plane. One of a one-scan-direction distortion correction for suppressing a distortion in an image along one scan direction on the projection plane and a one-scan-direction scan speed correction for maintaining scanning speed of the light flux along the one scan direction on the projection plane almost constant is performed by using a shape of at least one optical surface in the projection optical system, the other correction is performed by controlling a turn of the reflector by the deflection controller, one of an other-scan-direction distortion correction for suppressing a distortion in an image along the other scan direction almost orthogonal to the one scan direction on the projection plane and an other-scan-direction scan speed correction for maintaining scanning speed of the light flux along the other scan direction on the projection plane almost constant is performed by using a shape of at least one optical surface in the projection optical system, and the other correction is performed by controlling a turn of the reflector by the deflection controller.

Further, according to another aspect of the present invention, an image projector includes: a light source; a deflector having first and second reflectors for sequentially reflecting a light flux emitted from the light source, and two-dimensionally deflecting the light flux by turning the first reflector around a first axis as a center and turning the second reflector around a second axis as a center, the second axis apart from the first axis as a reference by a predetermined distance along a predetermined straight line almost orthogonal to the first axis and turned by almost 90° around the predetermined straight line as a center; a deflection controller for controlling the first reflector so as to be turned around the first axis as a center and controlling the second reflector so as to be turned around the second axis as a center; and a projection optical system for projecting the image onto the projection plane by guiding the light flux deflected by the deflector onto the projection plane. One of a one-scan-direction distortion correction for suppressing a distortion in an image along one scan direction on the projection plane and a one-scan-direction scan speed correction for maintaining scanning speed of the light flux along the one scan direction on the projection plane almost constant is performed by using a shape of at least one optical surface in the projection optical system, the other correction is performed by controlling a turn of the first or second reflector by the deflection controller. One of an other-scan-direction distortion correction for suppressing a distortion in an image along the other scan direction almost orthogonal to the one scan direction on the projection plane and an other-scan-direction scan speed correction for maintaining scanning speed of the light flux along the other scan direction on the projection plane almost constant is performed by using a shape of at least one optical surface in the projection optical system, and the other correction is performed by controlling a turn of the first or second reflector by the deflection controller.

Therefore, an object of the present invention is to provide an image projector capable of projecting a high-quality image while realizing small size.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a functional configuration of an image projector according to a first embodiment;

FIGS. 4 and 5 are diagrams showing a schematic configuration of an optical mechanism;

FIG. 7 is a block diagram showing a functional configuration of a vertical drive signal circuit;

FIGS. 8A to 8D are diagrams showing waveforms of drive signals in vertical scan;

FIG. 9 is a diagram for explaining removal of higher harmonics;

FIGS. 11A to 11E are diagrams showing waveforms of drive signals in horizontal scan;

FIGS. 12A and 12B are diagrams showing a mode of correcting distortion in the horizontal scan direction;

FIG. 15 shows a table of correcting methods;

FIGS. 16A to 16C are diagrams showing a result of optical correction and deflection scan drive correction;

FIG. 17 is a schematic diagram illustrating a state of a projection image;

FIG. 18 is a diagram showing a speed distribution of horizontal scan on a horizontal scan line;

FIG. 21 shows a table of correcting methods;

FIG. 22 is a schematic diagram illustrating a result of optical correction;

DESCRIPTION OF THE PREFERRED EMBODIMENTS

Figure 2:
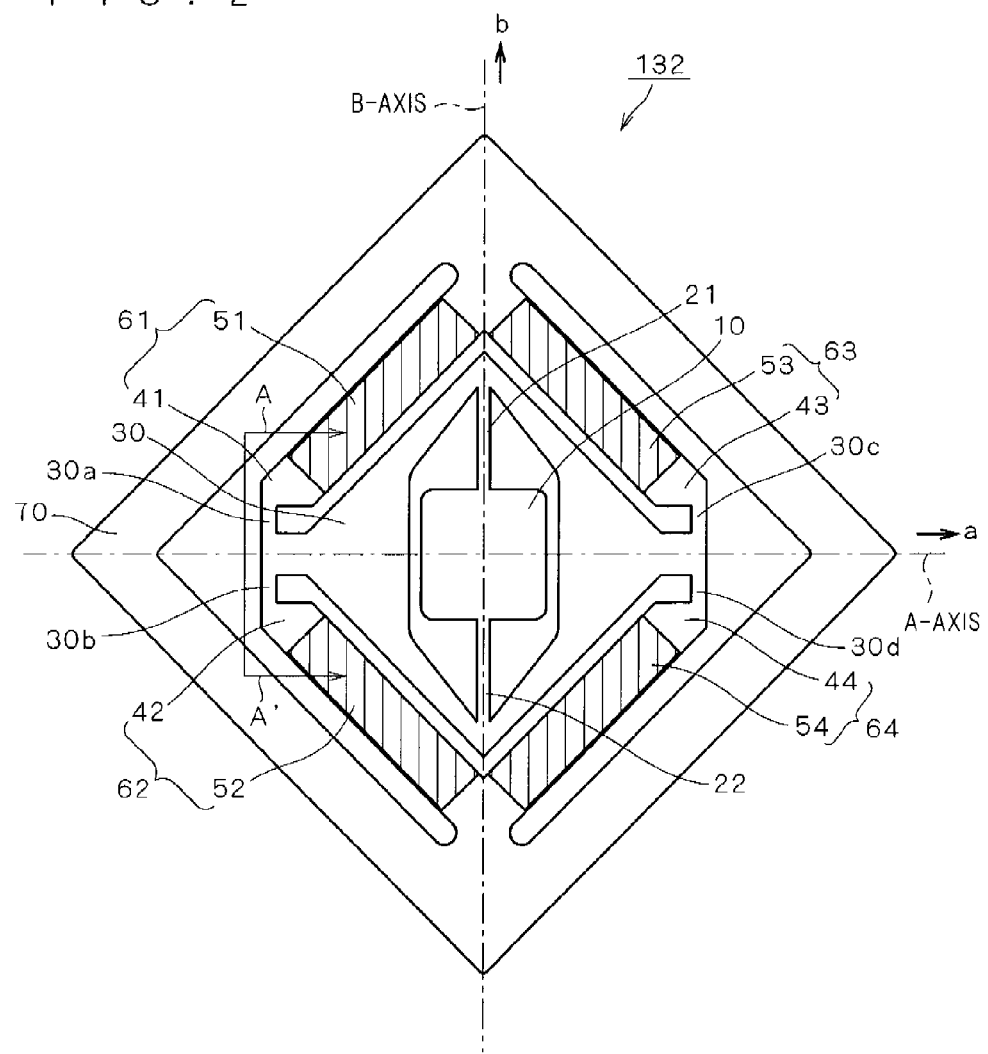
FIG. 2 is a diagram showing the configuration of a two-dimensional deflector.

Embodiments of the present invention will be described with reference to the drawings.

Conventional Image Projector and its Problems

Prior to explanation of an image projector according to an embodiment of the present invention, to clarify characteristic parts of the image projector according to the embodiment of the present invention, a conventional image projector and its problems will be described.

As a conventional small-sized image projector, a projector using a DMD (Digital Micromirror Device) or a liquid crystal device is known. In a so-called micro-display method of enlargedly projecting an image on a screen by using such a DMD or liquid crystal device, to project a two-dimensional image on the DMD or liquid crystal device, an illumination optical system and a projection optical system which are relatively large are necessary. Consequently, downsizing of the apparatus is limited.

In contrast, a projector of a system of modulating brightness of a laser beam (laser scanning method) while two-dimensionally scanning a light flux of a laser beam on a screen by turning a small mirror (deflection scan mirror) such as a mirror formed by a so-called MEMS (Micro Electro Mechanical Systems) technique around two orthogonal axes as centers can be miniaturized. The reason is that the deflection scan mirror is smaller than the DMD or the like in the image projector. The illumination optical system is small because it is sufficient to emit a laser beam to the deflection scan mirror, and the projection optical system is small because it is sufficient to guide a very narrow light flux reflected by the deflection scan mirror to the screen.

The image projector employing the laser scanning method is desired to project a brighter image having high resolution, that is, high quality. To realize a projection image of high quality, it is important to suppress fluctuations in the speed of a scan with a laser beam (that is, assurance of constant scan speed) and to suppress a distortion in a projection image. This point will be described later.

Basic Operation of Conventional Image Projector

Assuming the case of using an image signal such as a general NTSC signal, to project a dynamic image of high resolution onto a screen by two-dimensionally scanning the screen with a laser beam by a deflection scan mirror such as an MEMS mirror or two-dimensionally scanning the screen with a laser beam by a combination of turns of two deflection scan mirrors, it is necessary to perform a vertical scan at low speed and perform a horizontal scan at high speed.

Concretely, in the deflection scan mirror, in response to a vertical sync signal of a dynamic image signal, turn corresponding to the vertical scan is performed in cycles to an extent that the user does not feel flicker of 60 Hz or the like. In response to a horizontal sync signal of a dynamic image signal, turn corresponding to the horizontal scan is performed according to the number of horizontal scan lines during the cycle of the vertical scan. The ratio between the frequency of the vertical scan and the frequency of the horizontal scan corresponds to the resolution in the vertical scan direction.

Therefore, for example, to realize resolution (1,024 pixels in the horizontal direction×768 pixels in the vertical direction) of so-called XGA, the deflection scan mirror has to perform turns corresponding to the horizontal scan at a frequency of about 48 KHz (=60×806) considering also pixels in a so-called blanking period. In the case of performing drawing using both of the forward path and the backward path in the horizontal scan, the deflection scan mirror has to perform turns corresponding to the horizontal scan at a frequency of about 24 KHz which is the half of 48 KHz.

Since driving of the deflection scan mirror at the frequency of 24 KHz for a horizontal scan is very-high-speed driving, it is preferable to use so-called resonant drive which can realize a large mechanical amplitude at high speed. If the resonant drive is not used, amplitude or speed becomes insufficient. Therefore, the drive of the deflection scan mirror corresponding to a horizontal scan is preferably a so-called sine-wave drive. The "resonant drive" in this case denotes drive using the resonance phenomenon that amplitude increases suddenly around the natural vibration frequency of a vibration system when the vibration forcedly applied from the outside is constant and the vibration frequency is changed. It means that the deflection scan mirror is driven at a frequency adjusted to the natural vibration frequency of the deflection scan mirror. The "sine-wave drive" in this case denotes drive in which the displacement amount of the turn angle of the deflection scan mirror with lapse of time shows a sine-wave shape.

Since driving of the deflection scan mirror at the frequency of 60 Hz for a vertical scan is relatively-low-speed driving, a driving method using no resonance (hereinafter, also called "non-resonant drive") can be employed. For example, when the frame rate of a moving picture (the frame image switching frequency) is 60 Hz, it is sufficient that the displacement amount of the turn angle of the deflection scan mirror with lapse of time has a sawtooth wave shape and the frequency is 60 Hz. In the case of performing drawing using the forward and backward paths of turn of the deflection scan mirror, it is sufficient that the displacement amount of the turn angle of the deflection scan mirror with lapse of time has a triangle wave shape and the frequency is 30 Hz.

The problems caused by the resonant drive and the non-resonant drive and importance of solving the problems will be described.

Importance of Constant Speed in Scan

First, uniformity in speed (constant speed) of a horizontal scan on a projection plane (for example, screen) using the sine-wave drive will be described.

When a horizontal scan is realized by using resonance, the difference occurs in horizontal scan speed between a center area and a peripheral area of the projection plane.

Particularly, since the turn speed is zero at both ends of a displacement in the turn of the deflection scan mirror corresponding to the horizontal scan, it is difficult to use the entire range of the displacement in the turn of the deflection scan mirror for a horizontal scan on the projection plane. For example, when 75% of the cycle of a turn (turn cycle) of the deflection scan mirror is used for a horizontal scan, a horizontal scan is performed by using about 92% (=sin[90°× 0.75]×100%) of the entire range of the displacement of the turn angle of the deflection scan mirror. In the following, properly, the period used for a horizontal scan in the cycle of a turn of the deflection scan mirror will be also called a "horizontal scan effective period". The angle range used for a horizontal scan in the entire range of the displacement of the turn angle of the deflection scan mirror will be also called a "horizontal scan effective angle range".

In the case of using 75% of the turn cycle for a horizontal scan as described above, the scan speed at ends in the horizontal scan effective angle range becomes about 38% (cos [90°×0.75]×100%) of the scan speed in the center. As described above, as long as the sine-wave drive method is used to realize a horizontal scan, it is difficult to assure constant speed by correcting variations in the speed of a horizontal scan by mechanical control. In the following, the ratio (use ratio) of time used for a horizontal scan occupying the turn cycle in the horizontal scan will be properly called "H-direction time use ratio", and the ratio (use ratio) of time used for a vertical scan occupying the turn cycle in the vertical scan will be properly called "V-direction time use ratio".

In the case of correcting variations in the speed of the horizontal scan by an image process, for example, a method of changing the number of clocks corresponding to one dot (that is, one pixel or one picture element) between the center and a peripheral area in the projection plane can be considered.

For example, to change the clock generation interval only by 0.4 time in order to correct the difference of the scan speed of 0.38 time, a method of dividing one dot to, for example, 10 clocks, expressing one dot by 10 clocks in a peripheral area, and expressing one dot by four clocks in the center is considered. However, in the case of resolution of XGA of 60 Hz, the frequency of about 650 MHz (=60×1,344×806×10 [Hz]) is necessary for modulation of a laser beam. Under such a condition, it is necessary to emit pulse light of about 1.5 nano seconds (ns) per clock. However, a laser apparatus capable of performing high-speed modulation is very expensive.

Also in the image processing circuit, there is a limit in the high-speed process. For example, the operating frequency of an FPGA (Field Programmable Gate Alley) circuit which is regarded as a high-frequency circuit at present is about 10 GHz. The operating frequency necessary to express the resolution of an XGA whose frame rate is 60 Hz in eight bits (256 shades of gray) is about 12 GHz. Therefore, with progressed technology, higher operating frequency of a processor can be realized but the image processing circuit is also expensive and it is not preferable.

Further, since unevenness in brightness caused by variations in the scan speed cannot be corrected even if the imaging process is performed, by lowering the brightness (intensity of a laser beam) in a peripheral part in the projection plane, unevenness in brightness of an entire image is corrected. However, the entire image becomes dark as a result and it is not preferable.

The importance of correction on variations in speed of a horizontal scan has been described above. In the case of performing sine-wave drive (reciprocating drive) on the deflection scan mirror also for a vertical scan in a manner similar to that for a horizontal scan, the turn speed becomes zero at both ends of a displacement in the turn of the deflection scan mirror corresponding to the vertical scan. It is difficult to use the entire range of displacement of the turn of the deflection scan mirror for a vertical scan on the projection plane. Problems similar to those in the horizontal scan occur.

As described above, when the constant speed of the horizontal and vertical scans is lost, for example, when laser beams fluctuate at the same timing, the space between pixels is reproduced narrow at a low scan speed and is reproduced wide at a high scan speed. The size of the image area on a surface to be scanned varies, that is, distortion occurs in the image. Further, the image area in which the scan speed is low becomes brighter relative to the other area, and unevenness occurs in the brightness of the image. It is unpreferable to change the modulation speed of a laser beam in order to solve such a problem because the change leads to increase in the cost. It is also unpreferable to suppress unevenness of brightness in an image by an image process because the suppression leads to decrease in brightness of the image.

Importance of Correction of Distortion in Image

Figure 25A:
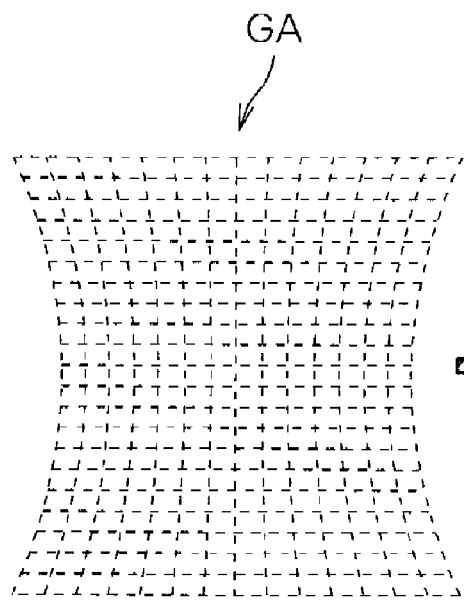
FIGS. 25A and 25B are diagrams for explaining correction by an image process.

It is generally known that when a deflection scan mirror for two-dimensionally scanning the projection plane with a laser beam is used, a bobbin-shaped distortion occurs in an image GA on the surface to be scanned as shown in FIG. 25A. Such a distortion in an image is unpreferable since it deteriorates the quality of a video image.

Further, it is mainly assumed that, generally, the image projector is used in a state where it is mounted on a desk or the like. To avoid inconveniences such that an image is projected onto a mounting surface and so-called shading occurs in an image, from the viewpoint of actual use, it is preferable to employ a projecting method of obliquely emitting light to the center of the projection plane. However, it is also generally known that when an image is projected obliquely to the projection plane, a problem (trapezoidal distortion) occurs such that an image (projected image) on the projection plane is distorted in a trapezoidal shape.

Therefore, it can be said that occurrence of various distortions in a projected image in actual use of the image projector is basically an unavoidable problem.

Figure 25B:
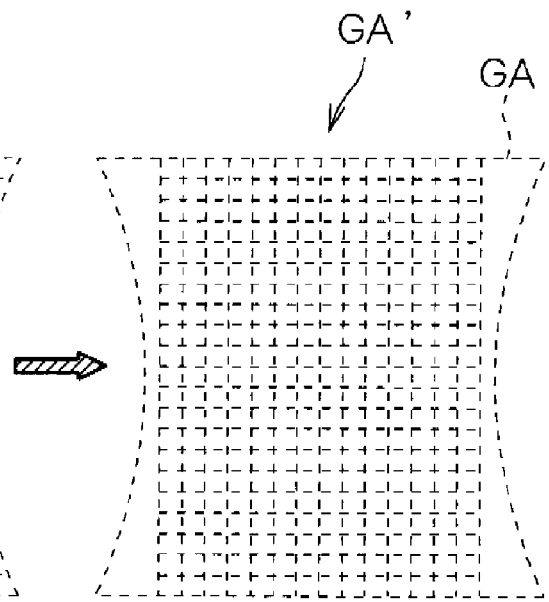

The case of correcting a distortion in a projected image by the image process proposed in SID 06 DIGEST, pp. 2015-2017, 73.3 will be described. There is a method of employing a rectangular area GA' as shown in FIG. 25B in an area (projection area) GA in which an image is projected in a distorted manner on the projection plane as shown in FIG. 25A, and projecting an image while modifying image data so as to be adjusted to the size of the area GA'. In the technique, however, since the projection area is cut, the projected image becomes smaller, and the brightness decreases by the amount of the cut area, the brightness of the whole screen decreases.

Problems in Conventional Image Projector

In an image projector using a deflection scan mirror for two-dimensionally scanning a projection plane with light while deflecting the light from a light source, to provide a bright, high-resolution image, it is desirable to properly assure a constant scan speed and correct a distortion in an image.

There is also a method of realizing excellent picture quality by correcting fluctuations in scan speeds in both of the horizontal and vertical scan directions and distortions in images only by projection optical system like the technique described in Japanese Patent Application Laid-Open No. 2006-178346. In the technique, the configuration of the projection optical system is complicated and it causes enlargement in the apparatus. When the projection optical system becomes too large, it conflicts the object of providing a small-sized image projector using a deflection scan mirror, and the object cannot be achieved.

The inventors of the present invention have created an image projector capable of providing an excellent image by correcting the above-described four items to be corrected without enlarging the apparatus. Concretely, the four items to be corrected are: fluctuations in a scan speed in the horizontal scan direction (correction item I), fluctuations in a scan speed in the vertical scan direction (correction item II), distortion in the horizontal scan direction (correction item III), and distortion in the vertical scan direction (correction item IV).

First Embodiment

Outline of Configuration of Image Projector

FIG. 1 is a block diagram showing a functional configuration of an image projector 100 according to a first embodiment of the present invention.

The image projector 100 is an apparatus for projecting a dynamic image onto a screen SC as a projection plane and mainly has an input image processor 110, a drive controller 120, and an optical mechanism 130.

The input image processor 110 has an image input circuit 111 and an image process circuit 112.

The image input circuit 111 receives an image signal input from an input device IM and outputs it to the image process circuit 112. The image process circuit 112 properly performs image process on the image signal from the image input circuit 111 and outputs the processed image signal to the drive controller 120.

An example of the input device IM is a personal computer, and an example of the image signal is a general NTSC signal. Examples of the image process in the image process circuit 112 are a general y converting process and a process of changing the order of pixel values in the case where the pixel scan order has to be changed.

The drive controller 120 has an image output circuit 121, a deflection control circuit 122, and a light source drive circuit 123.

The image output circuit 121 outputs a signal (control signal) for controlling a drive timing of a two-dimensional deflector 132 (which will be described later) to the deflection control circuit 122 in response to a horizontal sync signal and a vertical sync signal of the image signal, and outputs a signal (pixel data signal) according to a pixel value of the image signal to the light source drive circuit 123. The deflection control circuit 122 supplies a drive signal of potential according to the control signal from the image output circuit 121 to the two-dimensional deflector 132. The light source drive circuit 123 performs control so that light of a color and brightness according to the tone of an image data signal is emitted from a light source 133 (which will be described later) in accordance with the pixel data signal from the image output circuit 121. The control timing is set in response to the horizontal sync signal and the vertical sync signal of the image signal.

Each of the input image processor 110 and the drive controller 120 may be realized by a CPU, as a function, when the CPU reads and executes a predetermined program or constructed by a dedicated electron circuit.

The optical mechanism 130 has a projection optical system 131, the two-dimensional deflector 132, and the light source 133.

The light source 133 has a device (laser device) for generating a laser beam and a lens (collimate lens) for converting the laser beam emitted from the laser device to almost parallel light rays. The light source 133 has a combination of a laser device for generating a laser beam of red (R) color and a collimate lens for converting the laser beam of the R color to almost parallel light rays, a combination of a laser device for generating a laser beam of green (G) color and a collimate lens for converting the laser beam of the G color to almost parallel light rays, and a combination of a laser device for generating a laser beam of blue (B) color and a collimate lens for converting the laser beam of the B color to almost parallel light rays. The laser devices of the colors generate and output the laser beams having brightness according to the pixel values of the image signals in accordance with the pixel data signal from the light source drive circuit 123.

The laser devices for generating laser beams of the R and B colors are constructed by so-called semiconductor lasers, and the laser device for generating the laser beam of the G color is constructed by a so-called semiconductor-pumped solid-state laser. For example, when the wavelength of the laser beam of the R color is 630 nm, that of the laser beam of the G color is 532 nm, and that of the laser beam of the B color is 445 nm and maximum outputs of the laser devices of the R, G, and B colors are set to 150 mW, 120 mW, and 83 mW, respectively, a very clear image having clear white and high color reproducibility can be realized on the screen SC. The output value of the laser beam from the light source 133 satisfying the condition is about 100 lumen. In the case where a loss in the optical system extending from the light source 133 to the screen SC (a loss in surface reflection, a loss due to control in the two-dimensional deflector 132, a loss in color composition means which will be described later, and the like) is set to 50% in total, a laser beam having brightness of 50 lumen can be projected onto the screen SC.

The light source 133 modulates a laser beam output at a timing responding to the horizontal sync signal and the vertical sync signal in the image signal in accordance with the pixel data signal from the light source drive circuit 123. As a method of modulating a laser beam of the G color, direct modulation of a laser for pumping may be employed or external modulation of a so-called acoustooptical device (AO device) may be employed. A method of employing direct modulation of a semiconductor-pumped laser of a method of generating second harmonic by using a so-called PPLN (Periodically Poled Lithium Niobate) waveguide is more preferable because no AO device is required.

The two-dimensional deflector 132 has a part (reflection part) for reflecting a light flux generated from the light source 133. The reflection part turns around two axes almost orthogonal to each other as a center, thereby deflecting the light flux from the light source 133 so as to be reflected two-dimensionally. In the specification, operation of changing the traveling direction of the light flux independently in each of the vertical direction and the horizontal direction, that is, deflecting the light flux in the vertical direction and also in the horizontal direction by turning the reflection part around the two axes as the centers will be expressed as "two-dimensional deflection".

FIG. 2 is a front view illustrating the configuration of the two-dimensional deflector 132. A concrete configuration of the two-dimensional deflector 132 will be described below with reference to FIG. 2.

The two-dimensional deflector 132 is constructed by a so-called MEMS (Micro Electro Mechanical Systems) mirror obtained by microfabricating a silicon chip. In the following, the two-dimensional deflector 132 will be properly also called an MEMS mirror 132.

The two-dimensional deflector 132 has, mainly, a deflection scan mirror 10, two torsion bars 21 and 22, a movable frame 30, four piezoelectric elements 51 to 54, four installation parts 41 to 44, four narrow coupling parts 30a to 30d, and a fixed frame 70.

The fixed frame 70 is fixed to the casing of the image projector 100 and is a frame made by four sides obtained by disposing four plate parts in an almost rectangular shape. The outer and inner edges form an almost square shape whose diagonal lines are an a-axis and a b-axis almost perpendicularly crossing each other. The inner edges form an almost square space.

The two installation parts 41 and 43 are coupled to the parts in the +b direction (upper part in FIG. 2) on the b-axis on the inner side of a corner of the fixed frame 70. The installation part 41 is disposed along a side positioned in the −a direction and the +b direction (upper left part in FIG. 2) of the fixed frame 70. The installation part 43 is disposed along a side positioned in the +a direction and the +b direction (upper right part in FIG. 2) of the fixed frame 70. The two installation parts 42 and 44 are coupled to the parts in the −b direction (lower part in FIG. 2) on the b-axis on the inner side of a corner of the fixed frame 70. The installation part 42 is disposed along a side positioned in the −a direction and the −b direction (lower left part in FIG. 2) of the fixed frame 70. The installation part 44 is disposed along a side positioned in the +a direction and the −b direction (lower right part in FIG. 2) of the fixed frame 70.

To the installation parts 41 to 44, the piezoelectric elements 51 to 54 are bonded along the extension directions of the installation parts 41 to 44. Therefore, an extensible installation part 61 is constructed so as to extend in the −a and −b directions (lower left direction in FIG. 2) from the inner side of the corner at which the installation part 41 and the piezoelectric element 51 are positioned in the +b direction (upper part in FIG. 2) of the fixed frame 70. An extensible installation part 62 is constructed so as to extend in the −a and +b directions (upper left direction in FIG. 2) from the inner side of the corner at which the installation part 42 and the piezoelectric element 52 are positioned in the −b direction (lower part in FIG. 2) of the fixed frame 70. An extensible installation part 63 is constructed so as to extend in the +a and −b directions (lower right direction in FIG. 2) from the inner side of the corner at which the installation part 43 and the piezoelectric element 53 are positioned in the +b direction (upper part in FIG. 2) of the fixed frame 70. An extensible installation part 64 is constructed so as to extend in the +a and +b directions (upper right direction in FIG. 2) from the inner side of the corner at which the installation part 44 and the piezoelectric element 54 are positioned in the −b direction (lower part in FIG. 2) of the fixed frame 70.

The extensible installation parts 61 and 62 are disposed so as to be apart from each other by a predetermined distance while sandwiching the a-axis, and the extensible installation parts 63 and 64 are disposed so as to be apart from each other by a predetermined distance while sandwiching the a-axis.

The end on the a-axis side of the extensible installation part 61 is coupled to the movable frame 30 via the narrow coupling part 30a. The end on the a-axis side of the extensible installation part 62 is coupled to the movable frame 30 via the narrow coupling part 30b. The end on the a-axis side of the extensible installation part 63 is coupled to the movable frame 30 via the narrow coupling part 30c. The end on the a-axis side of the extensible installation part 64 is coupled to the movable frame 30 via the narrow coupling part 30d.

In a manner similar to the fixed frame 70, the movable frame 30 is a frame made by four sides obtained by disposing four plate parts in an almost rectangular shape. The outer edges form an almost square shape whose diagonal lines are an a-axis and a b-axis almost perpendicularly crossing each other. The inner edges form a hexagonal space.

The torsion bar 21 extends in the −b direction (downward in FIG. 2) in the part in the +b direction (upward in FIG. 2) on the b-axis on the inside of the corner of the movable frame 30. The torsion bar 22 extends in the +b direction (upward in FIG. 2) in the part in the −b direction (downward in FIG. 2) on the b-axis on the inside of the corner of the movable frame 30.

The deflection scan mirror 10 is coupled to the end on the side which is not coupled to the movable frame 30 of the torsion bar 21. The deflection scan mirror 10 is coupled to the end on the side which is not coupled to the movable frame 30 of the torsion bar 22. That is, the torsion bars 21 and 22 support the deflection scan mirror 10 so as to sandwich it in the +Y and −Y directions. That is, the movable frame 30 supports the torsion bars 21 and 22 supporting the deflection scan mirror 10.

The deflection scan mirror 10 is an almost-square-shaped reflecting mirror having, as outer edges, two sides almost parallel with the a-axis and two sides almost parallel with the b-axis. The deflection scan mirror 10 is disposed in almost center of the two-dimensional deflector 132 and reflects a laser beam to be projected.

Each of the two torsion bars 21 and 22 has a thin and elongated shape and is therefore elastically deformed relatively easily. The narrow coupling parts 30a to 30d are also thin and elongated so that they are elastically deformed relatively easily.

Concretely, the deflection scan mirror 10 turns as follows. When voltage is properly applied to the piezoelectric elements 51 to 54, the length of the piezoelectric elements 51 to 54 changes according to the applied voltage, so that the installation parts 41 to 44 to which the piezoelectric elements 51 to 54 are attached expand/contract in the extension directions. Specifically, the extensible installation parts 61 to 64 expand/contract in the extension directions. Therefore, for example, by interchanging the positive and negative signs of the voltage applied to the piezoelectric elements 51 and 53 and the voltage applied to the piezoelectric elements 52 and 54 and applying voltages of opposite phases to the piezoelectric elements 51 and 53 and the piezoelectric elements 52 and 54, the deflection scan mirror 10 turns around the a-axis as a center. On the other hand, by interchanging the positive and negative signs of the voltage applied to the piezoelectric elements 51 and 52 and the voltage applied to the piezoelectric elements 53 and 54 and applying voltages of opposite phases to the piezoelectric elements 51 and 52 and the piezoelectric elements 53 and 54, the deflection scan mirror 10 turns around the b-axis as a center.

By overlappingly applying a drive signal for realizing the turn of the deflection scan mirror 10 around the a-axis as a center and a drive signal for realizing the turn of the deflection scan mirror 10 around the b-axis as a center to the four piezoelectric elements 51 to 54, the deflection scan mirror 10 performs resonant drive around the b-axis using the torsion bars 21 and 22 as a fulcrum and drive for turning the movable frame 30 together with the deflection scan mirror 10 and the torsion bars 21 and 22 around the a-axis as a center. Therefore, only by the single device having the single deflection scan mirror 10, low-speed turn around the a-axis as a center and high-speed turn around the b-axis as a center using resonant drive can be performed simultaneously. That is, by deflecting the laser beam in different two directions, the horizontal scan and the vertical scan with the laser beam on the screen SC can be performed simultaneously. It is preferable to perform a two-dimensional scan in which the horizontal scan and the vertical scan are performed simultaneously by the single device from the viewpoint of reducing the number of parts of the two-dimensional deflector 132. It is preferable also from the viewpoints of decreasing the manufacture cost and reducing the work required for adjustment of the device.

In the following description, it is assumed that the effective diameter (pupil diameter) φ of the MEMS mirror 132 is 1 mm.

The projection optical system 131 projects a dynamic image onto the screen SC by guiding a light flux deflected by the two-dimensional deflector 132 whose turn angle is properly changed, onto the screen SC as a projection plane. In FIG. 1, travel of the laser beam from the light source 133 via the two-dimensional deflector 132 and the projection optical system 131 onto the screen SC is indicated by the thick broken-line arrow. The concrete configuration of the optical mechanism 130 having the projection optical system 131, the two-dimensional deflector 132, and the light source 133 will be further described later.

As described above, by the image projector 100, the input device IM, and the screen SC, the image projection system for visibly outputting image data from the input device IM onto the screen SC is formed.

Use Mode of Image Projector

Figure 3:
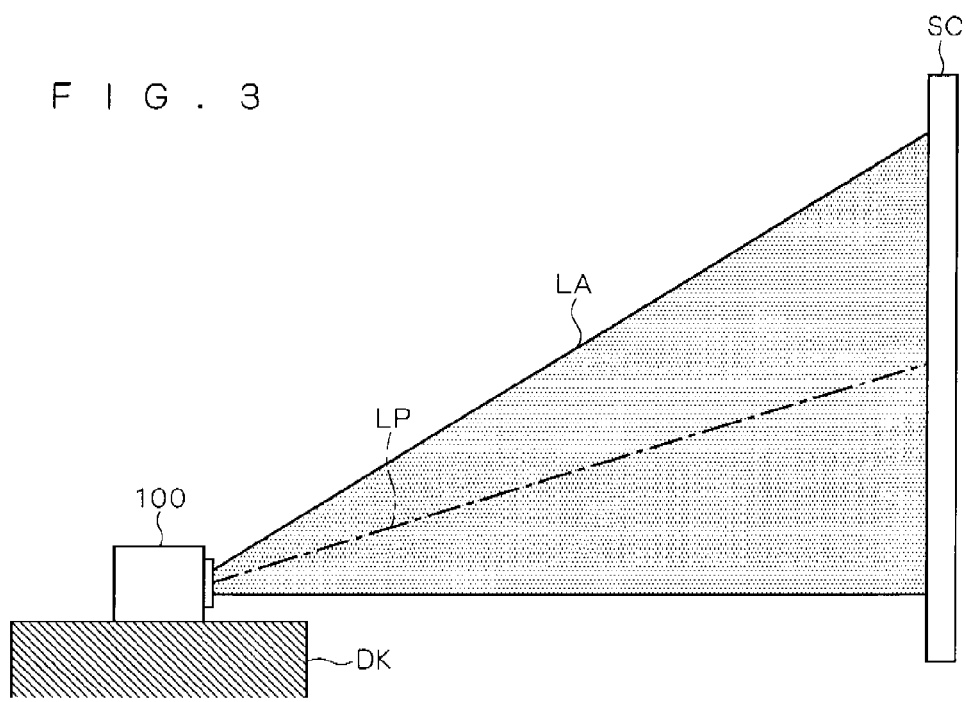
FIG. 3 is a schematic diagram illustrating a use mode of the image projector.

FIG. 3 is a schematic diagram showing an example of a typical use mode of the image projector 100 viewed from a side of the projection direction.

FIG. 3 shows a mode of projecting a dynamic image on the screen SC while properly scanning the screen with a light flux and deflecting the light flux in a state where, for example, the image projector 100 is placed on a desk DK. In FIG. 3, a light pass area (light flux passage area) LA of the light flux which is properly deflected is half-tone dot meshed.

As shown in FIG. 3, the central axis (that is, light axis) LP of the light flux passage area LA of the image projector 100 toward the screen SC is tilted with respect to the screen SC so that a missing part (that is, so-called shading) does not occur in the image projected on the screen SC. Specifically, the light axis LP of the image projector 100 is set to be tilted on the side opposite to the desk DK, that is, slightly upward. The screen SC is irradiated with light having the light axis LP in the oblique direction.

Optical Mechanism

Figure 4:
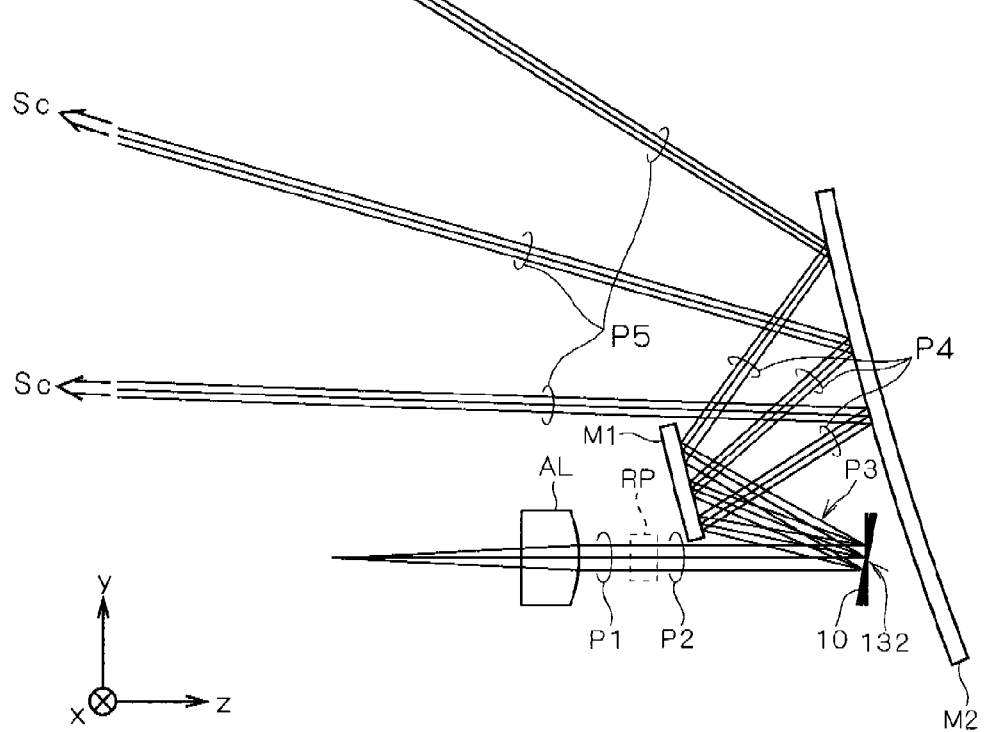

FIGS. 4 and 5 are diagrams showing a schematic configuration of the optical mechanism 130. FIG. 4 is a schematic diagram showing the optical paths of light fluxes emitted from the light source 133 to the screen SC viewed from side. FIG. 5 is a schematic diagram showing the optical path of a light flux emitted from the light source 133 toward the two-dimensional deflector 132 viewed from above. In FIGS. 4 and 5, three axes of x, y, and z orthogonal to each other are shown to clarify the azimuth relations. In FIG. 4, the optical paths are schematically shown. In reality, as shown in FIG. 5, the optical path on the light source 133 side is reflected by a reflection mirror Mr (which will be described later) to a direction perpendicular to the drawing in a region RP (region surrounded by a broken line in FIG. 4). In FIG. 5, laser beams of R, G, and B colors are shown slightly shifted from each other for convenience. FIG. 4 shows the optical paths of light fluxes deflected at different three angles by turn of the deflection scan mirror 10 of the two-dimensional deflector 132.

The optical mechanism 130 has, in order from the light source 133 side, laser devices (not shown) for generating laser beams of different colors, collimator lenses (not shown) of the colors, a prism DP, an anamorphic lens AL, the reflection mirror Mr, the two-dimensional deflector 132, a first projection mirror M1, and a second projection mirror M2.

The prism DP is means (color combining means) for combining laser beams Lr, Lg, and Lb of three colors of R, G, and B which are incident while almost crossing each other. The light combined by the prism DP enters the anamorphic lens AL. The color combining means is not limited to the prism but may be a combination of dichroic mirrors.

The anamorphic lens AL is an incidence optical system whose plane ALa on the light source 133 side, that is, a laser beam incident plane ALa has a flat surface and whose plane (emission plane) ALb from which the laser beam goes out is a plane (anamorphic plane) whose curvature radius along the y direction and whose curvature radius along the z direction are different from each other. A light flux P1 emitted from the emission plane ALb is reflected by the reflection mirror Mr and enters the two-dimensional deflector 132 as a light flux P2 obtained by changing the emission direction of the light flux P1 by about 90°.

In the two-dimensional deflector 132, the deflection scan mirror 10 turns properly around two axes (a-axis and b-axis) as centers, thereby deflecting the light flux P2 to obtain a light flux P3. The light flux P3 is incident on the first projection mirror M1.

The first projection mirror M1 and the second projection mirror M2 construct the projection optical system 131. The light flux P3 from the two-dimensional deflector 132 is reflected by the first projection mirror M1, thereby becoming a light flux P4 whose emission direction is changed. Further, the light flux P4 is reflected by the second projection mirror M2 becomes a light flux P5 whose emission direction is changed, and the light flux P5 is projected onto the screen SC.

The two-dimensional deflector 132, the first projection mirror M1, and the second projection mirror M2 are disposed so as not to block the reflected light fluxes. For example, a mode in which the two-dimensional deflector 132, the first projection mirror M1, and the second projection mirror M2 are disposed on a straight line almost parallel with the z-axis is not considered for the reason that the light fluxes are blocked by another member. Therefore, the two-dimensional deflector 132, the first projection mirror M1, and the second projection mirror M2 are disposed so as to be shifted from each other in the direction along short sides of an image at angles adjusted in accordance with the shift amount. The method of shifting an optical path each time light is reflected will be also called "beam division".

Concretely, an image usually has a horizontally-long shape such as horizontal size:vertical size=4:3 or 16:9. When the optical paths are shifted in the direction along the short side (the long-side direction), the beam division is performed more easily, and it is preferable from the view of narrowing the area in which the two-dimensional deflector 132, the first projection mirror M1, and the second projection mirror M2 are disposed. That is, it is preferable from the viewpoint of miniaturization of the projection optical system 131 and, moreover, miniaturization of the image projector 100.

A concrete method of correcting the above-described four items to be corrected, specifically, fluctuations in a scan speed in the horizontal scan direction (correction item I), fluctuations in a scan speed in the vertical scan direction (correction item II), distortion in the horizontal scan direction (correction item III), and distortion in the vertical scan direction (correction item IV) will be described. In the specification, correction of making the scan speed of a light flux in the horizontal scan direction on the screen SC almost constant will be also called "horizontal-scan-direction speed correction". Correction of suppressing a distortion in an image along the horizontal scan direction on the screen SC will be also called "horizontal-scan-direction distortion correction". Correction of making the scan speed of a light flux in the vertical scan direction on the screen SC almost constant will be also called "vertical-scan-direction speed correction". Correction of suppressing a distortion in an image along the vertical scan direction on the screen SC will be also called "vertical-scan-direction distortion correction".

Correction Item I: Fluctuations in Scan Speed in the Horizontal Scan Direction

A horizontal scan of a projected plane with a laser beam is realized by performing a turn of making the deflection scan mirror 10 of the two-dimensional defector 132 resonate around the b-axis as a center. It is consequently difficult to make a correction so as to provide constant speed by the drive control of the two-dimensional deflector 132. Therefore, preferably, by properly adjusting the shape of the projection optical system 131, the scan speed of the laser beam in the horizontal scan direction is corrected and constant speed in the horizontal scan direction is realized. To realize constant speed in the horizontal scan direction, for example, it is preferable to provide a so-called f-arcsine characteristic in a direction corresponding to the horizontal scan direction of the reflection faces of the first and second projection mirrors M1 and M2. Provision of the f-arcsine characteristic is realized by a known technique as described in Japanese Patent Application Laid-Open No. 2006-178346 and the like. That is, it is preferable to construct the reflection faces of the first and second projection mirrors M1 and M2 so that the negative power increases toward the periphery in the direction corresponding to the horizontal scan direction.

The f-arcsine characteristic is required to assure constant speed in the horizontal scan direction. For a direction corresponding to the vertical scan direction in the reflection faces of the first and second projection mirrors M1 and M2, it is sufficient to give so-called f-$\theta$ characteristic and f Tan $\theta$ characteristic. Preferably, the characteristics along the directions corresponding to the vertical and horizontal scan directions in the reflection face of the projection optical system 131 are different from each other.

From the viewpoint of deflecting the light at an angle as large as possible along the direction corresponding to the horizontal scan direction, it is preferable to give the f-arcsine characteristic along the direction corresponding to the horizontal scan direction of the reflection face of a reflection mirror having a relatively large reflection face along the direction corresponding to the horizontal scan direction out of the first and second projection mirrors M1 and M2. In other words, it is preferable to provide the f-arcsine characteristic along a direction corresponding to the horizontal scan direction of the reflection mirror by which an incident laser beam is split to the largest range for the reason that the deflection angle of the laser beam can be controlled uniquely.

Further, from the viewpoint of maintaining the balance between the image formation state on the screen SC by aberration correction and the constant speed of a scan excellent, it is preferable to give the f-arcsine characteristic along the direction corresponding to the horizontal scan direction so that the reflection faces of the first and second projection mirrors M1 and M2 share the role.

Correction Item II: Fluctuations in Scan Speed in Vertical Scan Direction

The constant speed in the vertical scan direction may be realized by a method for employing both of correction using the characteristics of the projection optical system 131 and correction using drive control of the two-dimensional deflector 132. However, when the correction using the characteristics of the projection optical system 131 is made as described in Japanese Patent Application Laid-Open No. 2006-178346, the size of the projection optical system 131 becomes large. However, to miniaturize the image projector 100, it is preferable to miniaturize the projection optical system 131. Consequently, by adding a small number of circuits in the image projector 100, constant speed in the vertical scan direction is realized by correction of the drive control of the two-dimensional deflector 132.

First, the principle of the method of correcting scan speed in the vertical scan direction will be briefly described.

FIGS. 6A to 6D are diagrams showing the principle of the method of correcting scan speed in the vertical scan direction.

Figure 6A:
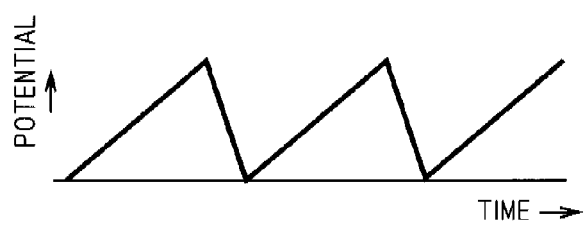
FIGS. 6A to 6D are diagrams showing the principle of a method of correcting scan speed in a vertical scanning direction.
Figure 6B:
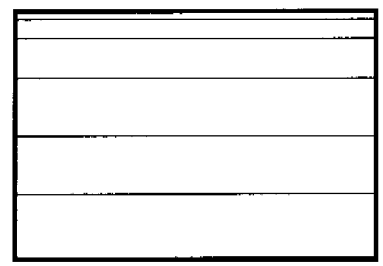
Figure 6C:
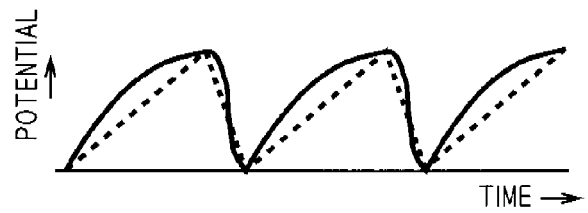
Figure 6D:
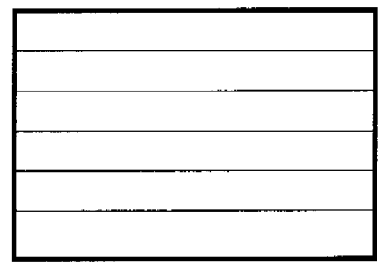

For example, when a saw-tooth drive signal (thick line) as shown in FIG. 6A is given to turn the deflection scan mirror 10 of the two-dimensional deflector 132 around the a-axis as a center at constant speed, it is expected that the vertical scan speed increases toward the bottom of an image on the screen SC as shown in FIG. 6B due to the angle relation between the image projector 100 and the screen SC. In such a case, the turn speed around the a-axis of the deflection scan mirror 10 of the two-dimensional deflector 132 as a center is varied. For example, as shown in FIG. 6C, a drive signal (thick line) obtained by properly correcting the waveform of the saw-tooth drive signal (broken line) is applied to make the deflection scan mirror 10 of the two-dimensional deflector 132 turn around the a-axis as a center, the turn speed is properly varied and adjusted so that the vertical scan speed on the screen SC becomes almost constant as shown in FIG. 6D.

The method of correcting scan speed in the vertical scan direction will be described using a concrete example.

FIG. 7 is a block diagram showing a functional configuration of a vertical drive signal circuit 122V for correcting the scan speed in the vertical scan direction. FIG. 8 is a diagram showing the waveform of a drive signal. The vertical drive signal circuit 122V is realized as a function included in the deflection control circuit 122.

The vertical drive signal circuit 122V has a drive signal generating unit V1, a harmonic suppressing unit V2, a correction signal generating unit V3, an adder V4, and a vertical drive circuit V5.

The drive signal generating unit V1 generates a drive signal (FIG. 8A) having a saw-tooth waveform to be applied to the two-dimensional deflector 132 to make a scan with a laser beam to be projected onto the screen SC at constant speed, that is, to make a linear scan, and outputs the drive signal to the harmonic suppressing unit V2. The drive signal having the saw-tooth waveform shown in FIG. 8A (hereinafter, also called "saw-tooth drive signal") has a period in which the signal intensity increases linearly (linear period).

The harmonic suppressing unit V2 generates a signal (FIG. 8B) obtained by removing unnecessary harmonic contents from the drive signal (FIG. 8A) from the drive signal generating unit V1, and outputs the resultant signal to the adder V4. The waveform of the drive signal after removing the higher harmonics shown in FIG. 8B becomes blunt, and the linear period becomes shorter. Usually, the drive signal as shown in FIG. 8B is applied to the two-dimensional deflector 132, and the linear period is used as a period for displaying an image of a frame (display period). In this case, the drive signal is corrected to make the vertical scan speed almost constant. A method of suppressing higher harmonics in the harmonic suppressing unit V2 will be described later.

The correction signal generating unit V3 generates a correction signal (FIG. 8C) for correcting the scan speed along the vertical scan direction so that the vertical scan speed becomes almost constant, and outputs the correction signal to the adder V4. Since the scan speed in the vertical scan direction is found in the optical design in advance, it is sufficient to set the waveform of the correction signal so as to cancel fluctuations in the vertical scan speed.

The adder V4 generates a signal (FIG. 8D) obtained by adding the correction signal (FIG. 8C) from the correction signal generating unit V3 to the signal (FIG. 8B) from the harmonic suppressing unit V2 and outputs the signal to the vertical drive circuit V5. For example, as shown in FIG. 8D, adjustment is performed so that the waveform in the linear period corresponding to the display period in the drive signal becomes nonlinear shape.

The vertical drive circuit V5 outputs a voltage (or current) necessary for the turn around the a-axis as a center to the two-dimensional deflector 132 in accordance with the signal (FIG. 8D) from the adder V4.

When attention is paid only to the turn of the deflection scan mirror 10 around the a-axis as a center, for example, it is sufficient to apply the signal shown in FIG. 8D as it is to the set of piezoelectric elements 51 and 53 in the upper part of FIG. 2, and apply the signal having the phase opposite to that of the signal shown in FIG. 8D to the set of piezoelectric elements 52 and 54 in the lower part of FIG. 2. Each of the piezoelectric elements 51 to 54 is provided with the positive and negative terminals, and the potential of the signal shown in FIG. 8D is properly applied.

In reality, however, the voltage (or current) output from the vertical drive circuit V5 is superimposed on a voltage (or current) necessary for the turn around the b-axis as a center of the two-dimensional deflector 132 output from a horizontal drive signal circuit 122H in a superimposing unit 122L. The resultant voltage is applied to the two-dimensional deflector 132, that is, the piezoelectric elements 51 to 54. The horizontal drive signal circuit 122H will be concretely described at the time of describing correction of distortion in the horizontal scan direction.

In such a manner, the drive signal for making the deflection scan mirror 10 turn around the a-axis as a center is adjusted to correct the scan speed in the vertical scan direction, and constant speed in the vertical scan direction is assured. Although the drive signal for making the deflection scan mirror 10 turn around the a-axis as a center is adjusted by the correction signal, the invention is not limited to the adjustment. A drive signal for making the deflection scan mirror 10 turn around the a-axis as a center may be properly adjusted by computation.

Suppression of the higher harmonics in the harmonic suppressing unit V2 will be described.

FIG. 9 is a diagram for explaining suppression of the higher harmonics in the harmonic suppressing unit V2. In FIG. 9, the horizontal axis indicates frequency. FIG. 9 shows the intensity (amplitude) of a frequency component in a drive signal having a saw-tooth waveform whose frequency is fv (hereinafter, also called "saw-toothed drive signal"), the relation (curve Ld) between the drive frequency applied to the two-dimensional deflector 132 and the maximum turn angle around the a-axis as a center, and a filter characteristic (curve Fs) in the harmonic suppressing unit V2.

As shown in FIG. 9, the saw-toothed drive signal has components from the basic frequency fv to higher harmonics in a wide frequency range NS.

As shown by the curve Ld in FIG. 9, the two-dimensional deflector 132 particularly responds to components of higher harmonics around a mechanical resonance frequency fvo of the two-dimensional deflector 132 out of the components of the higher harmonics of the saw-toothed drive signal having the frequency fv. Consequently, so-called ringing occurs in the turn around the a-axis of the two-dimensional deflector 132, ringing also occurs in the vertical scan with the laser beam on the screen SC, and it causes deterioration in the constant speed of the vertical scan. The components of higher harmonics of the frequencies equal to or higher than the mechanical resonance frequency fvo exert only an adverse influence on the driving of the two-dimensional deflector 132 but do not exert a good influence. It is therefore necessary to suppress the components of higher harmonics around the mechanical resonance frequency fvo and higher harmonics exceeding the components of higher harmonics.

By suppression of the components of higher harmonics, the saw-toothed signal becomes blunt, and the period in which the signal intensity changes linearly (linear period) is shortened (FIG. 8B). By the shortening of the linear period, the period in which the vertical scan is performed at an almost constant speed is limited. That is, the period in which an image of one frame is displayed (display period) is limited. The degree of limitation is influenced by the mechanical resonance frequency fvo. To achieve an excellent case where the relatively long linear period is obtained, it is sufficient to design so that higher harmonics which are more than about ten times as high as the frequency fv of the saw-toothed drive signal are removed. That is, to assure a linear period in which the vertical scan speed is almost constant to some extent, the range of the order of higher harmonics to be suppressed may be 10 or larger (concretely m=10 or larger) only as a guide.

Therefore, the configuration of the harmonic suppressing unit V2 has filter characteristics of both a filter (notch filter, parts "a" and "b" in the curve Fs in FIG. 9) having a characteristic (cutting characteristic) of removing higher harmonics mfv and (m+1)fv around the mechanical resonance frequency fvo (particularly, immediately lower and higher frequencies of fvo) from the saw-toothed drive signal and cancelling out the mechanical resonance frequency characteristic, and a low pass filter (LPF, the part "c" in the curve Fs in FIG. 9) for removing the components of higher harmonics of the higher order.

Another configuration may be employed in which the components of higher harmonics around the mechanical resonance frequency fvo and the components of higher harmonics of the higher order are removed. A waveform signal in which the linear period is assured as long as possible is generated and stored as digital data. A correction signal is added to the digital data. The resultant digital data is converted (D/A converted) to analog data, and the analog data is output to the vertical drive circuit V5.

Correction Item III: Distortion in Horizontal Scan Direction

When usability is considered, in many cases, as shown in FIG. 3, the image projector is mounted in a tilted state and projects an image onto the screen SC. Generally, when an image is obliquely projected onto the screen SC, so-called trapezoidal distortion such that the widths of the upper and lower sides of the projected image are different from each other occurs. Depending on parameters, there is a case that bobbin-shaped distortion as shown in FIG. 25A occurs. It is preferable to correct curve (that is, distortion) in pixel lines (hereinafter, also called vertical lines) along the vertical direction of the projected image to improve brightness and resolution of the projected image as described above.

For the correction of distortion in the horizontal scan direction, a method of realizing the correction by both correction using the characteristics of the projection optical system 131 and correction by the drive control of the two-dimensional deflector 132 is considered. However, when the correction by the characteristics of the projection optical system 131 is made as described in Japanese Patent Application Laid-Open No. 2006-178346, the size of the projection optical system 131 becomes large. However, to miniaturize the image projector 100, it is preferable to miniaturize the projection optical system 131. Consequently, by adding a small number of circuits in the image projector 100, correction of distortion in the horizontal scan direction is realized by the drive control of the two-dimensional deflector 132.

First, the principle of the method of correcting distortion in the horizontal scan direction will be briefly described.

In the case of correcting distortion in the horizontal scan direction by the drive control of the two-dimensional deflector 132, the voltage of the drive signal for a horizontal scan is modulated to change the amplitude in accordance with the displacement amount of the turn around the a-axis of the two-dimensional deflector 132, that is, the position of the vertical scan on the screen SC in correspondence with the degree of distortion in the horizontal scan direction. By such a control, without causing decrease in the brightness of a projected image, trapezoidal distortion or bobbin-shaped distortion in a projected image can be freely corrected.

To realize such a control, it is important that, even when the voltage of resonance driving of the deflection scan mirror 10 in the horizontal scan direction is changed dynamically, the deflection scan mirror 10 follows.

The method of correcting distortion in the horizontal scan direction will be described using a concrete example.

Figure 10:
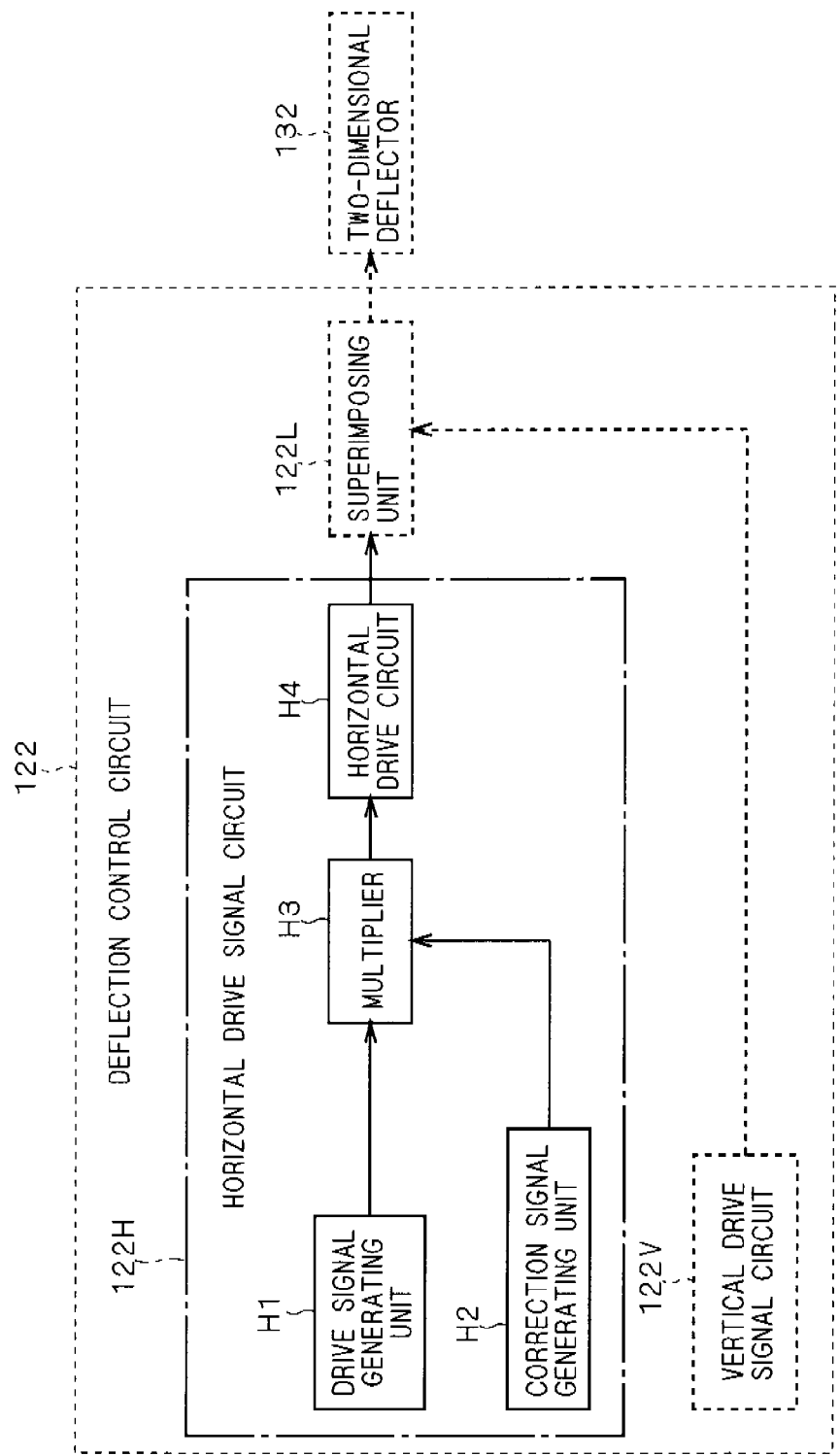
FIG. 10 is a block diagram showing a functional configuration of a horizontal drive signal circuit.

FIG. 10 is a block diagram showing a functional configuration of the horizontal drive signal circuit 122H for correcting distortion in the horizontal scan direction. FIGS. 11A to 11E are diagrams showing the waveforms of a drive signal. The horizontal drive signal circuit 122H shown in FIG. 10 is realized as a function included in the deflection control circuit 122. As an example, the case where the distortion in the horizontal scan direction is so-called trapezoidal distortion is shown. The waveforms of the drive signal shown in FIGS. 11A to 11E are those for correcting the so-called trapezoidal distortion.

The horizontal drive signal circuit 122H has a drive signal generating unit H1, a correction signal generating unit H2, a multiplier H3, and a horizontal drive circuit H4.

The drive signal generating unit H1 generates a sine-wave drive signal (FIG. 11A) having predetermined frequency and predetermined amplitude adapted to the mechanical resonance frequency of the deflection scan mirror 10 in order to make the deflection scan mirror 10 in the two-dimensional deflector 132 resonate at high speed, and outputs the drive signal to the multiplier H3.

The correction signal generating unit H2 generates a correction signal (FIG. 11C) for modulating the voltage of the drive signal for the horizontal scan and outputs the correction signal to the multiplier H3. Since distortion in the horizontal scan direction is found in the optical design in advance, it is sufficient to set the waveform of the correction signal so as to cancel the distortion in the horizontal scan direction. In the correction signal shown in FIG. 11C, to correct the trapezoidal distortion in which the width of the upper side of a projected image is relatively larger than that of the lower side, the potential gradually increases in a period of projecting and displaying an image of each frame onto the screen SC (display period). In the correction signal shown in FIG. 11C, the potential increased in the display period returns to the original potential in a so-called flyback period.

The multiplier H3 generates a signal (AM wave signal in FIG. 11D) obtained by multiplying the sine-wave drive signal (FIG. 11A) from the drive signal generating unit H1 with the correction signal (FIG. 11C) from the correction signal generating unit H2 and outputs the signal to the horizontal drive circuit H4. More specifically, by the multiplication of the multiplier H3, a drive signal is generated, having a waveform like an AM radio wave to which so-called envelope is given such that the amplitude of the sine-wave drive signal (FIG. 11A) is modulated by the correction signal (FIG. 11C) and the amplitude of the sine wave gradually increases in the display period. Consequently, the amplitude of the sine-wave drive signal for making the deflection scan mirror 10 repetitively turn around the b-axis as a center in the period of displaying an image of each frame is varied in accordance with the distortion in the horizontal scan direction.

The horizontal drive circuit H4 outputs a voltage (or current) necessary for the turn around the b-axis as a center to the two-dimensional deflector 132 in accordance with the AM wave signal (FIG. 11D) from the multiplier H3.

When attention is paid only to the turn of the deflection scan mirror 10 around the b-axis as a center, for example, it is sufficient to apply the AM wave signal shown in FIG. 11D as it is to the set of piezoelectric elements 51 and 52 in the left part of FIG. 2, and apply the signal having the phase opposite to that of the signal shown in FIG. 11D to the set of piezoelectric elements 53 and 54 in the right part of FIG. 2.

In reality, however, the voltage (or current) output from the horizontal drive circuit H4 is superimposed on a voltage (or current) necessary for the turn around the a-axis as a center of the two-dimensional deflector 132 output from the vertical drive signal circuit 122V in the superimposing unit 122L. The resultant voltage is applied to the two-dimensional deflector 132, that is, the piezoelectric elements 51 to 54.

In such a manner, when the amplitude of the drive signal for making the deflection scan mirror 10 turn around the b-axis as a center is varied, for example, the trapezoidal distortion in the horizontal scan direction shown in FIG. 12A is corrected so that the width of the horizontal scan on the screen SC becomes almost constant as shown in FIG. 12B. Although the amplitude of the drive signal for making the deflection scan mirror 10 turn around the b-axis as a center is varied by the correction signal in the embodiment, the invention is not limited to the embodiment. A drive signal for making the deflection scan mirror 10 turn around the b-axis as a center may be properly varied by computation.

Also by performing modulation by changing the duty ratio of a rectangular wave as shown in FIG. 11E using a modulation method called PWM (Pulse Width Modulation) from generating a rectangular wave (pulse wave) as shown in FIG. 11B in the drive signal generating unit H1, effects similar to those of the drive signal (FIG. 11D) enveloped as described above can be produced.

Next, trace of the width of a horizontal scan to a change in the amplitude of the drive signal having the envelope given by the correction signal will be described.

Figure 13:
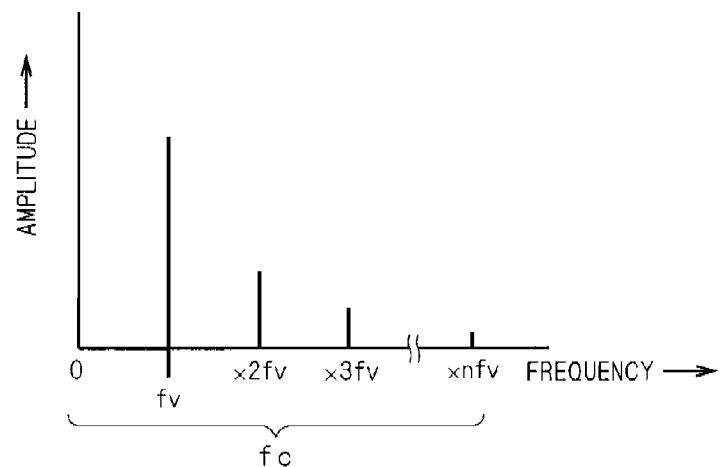
FIG. 13 is a diagram showing intensity of frequency components of a correction signal.

FIG. 13 is a diagram showing the intensity (amplitude) of a frequency component of the correction signal shown in FIG. 11C. As shown in FIG. 13, the frequency band fc of the correction signal shown in FIG. 11C has, generally, frequency components made by the fundamental wave of the frequency fv of a vertical sync signal and a group of higher harmonics.

It is assumed that a correction signal for correcting specific distortion in the horizontal scan direction has frequency components up to "n" times as high as the frequency fv of the fundamental wave, and the deflection scan mirror 10 of the two-dimensional deflector 132 is driven by a mechanical resonance frequency fom. Under such conditions, the control on the envelope by the correction signal can be regarded as a process of applying the AM wave signal (FIG. 11D) obtained by modulating the amplitude of the sine-wave drive signal (FIG. 11A) having the resonance frequency by the correction signal (modulation wave signal in FIG. 11C) and obtaining the response to the AM wave signal, that is, mechanical vibration enveloped.

Figure 14:
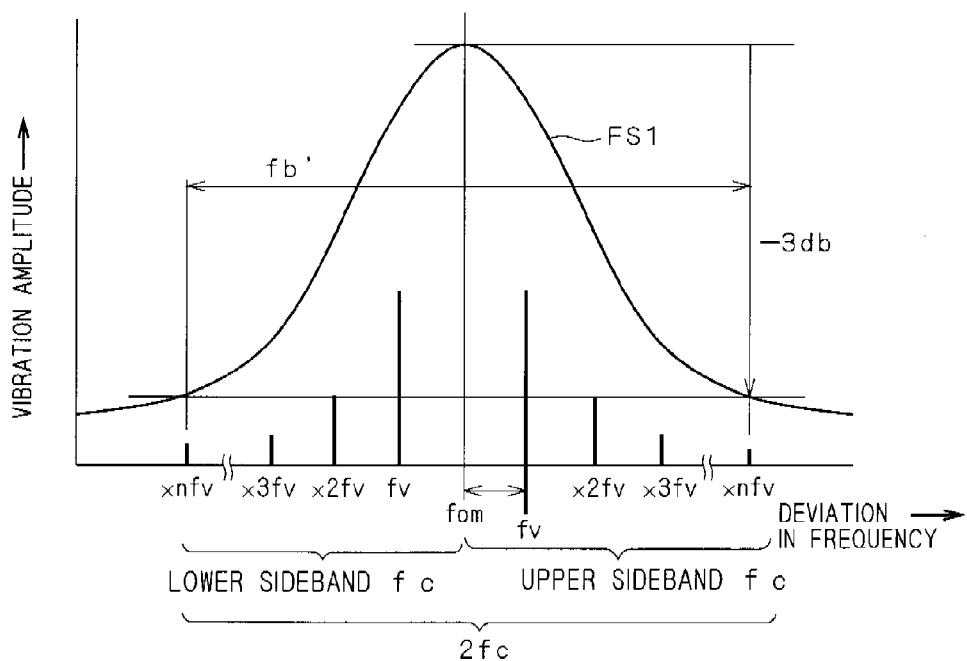
FIG. 14 is diagram showing intensity of frequency components of an AM wave signal.

FIG. 14 is a diagram showing the intensity of the frequency component of the AM wave signal (FIG. 11D). As shown in FIG. 14, the frequency components of the correction signal (FIG. 11C) appear as side bands of the AM wave signal, concretely, as a frequency band $2fc$ having a width fc on the high frequency side and a width fc on the low frequency side with respect to the mechanical resonance frequency fom as a center. The AM wave signal is subject to filtering of the side bands, that is, decrease or removal of the intensity of the frequency component in accordance with the mechanical resource characteristic of the deflection scan mirror 10. Consequently, if an envelope is simply given by the correction signal shown in FIG. 11C, the shape of the envelope in the mechanical vibration becomes a blunt shape obtained by passing the correction signal through a kind of a low pass filter and performing multiplication. That is, if nothing is performed, the effects of the correction of distortion in the horizontal scan direction are subject to the influence of the mechanical resonance characteristic (the influence of deformation of making the envelope blunt in the mechanical vibration) in the turn around the b-axis as a center of the deflection scan mirror 10. In FIG. 14, the characteristic of the low pass filter, that is, the mechanical resonance characteristic is expressed by the curve FS1.

There are the following methods as methods of improving the traceability of driving of the deflection scan mirror 10 in the case of dynamically changing the amplitude of the drive signal to be given to the two-dimensional deflector 132, concretely, methods of suppressing deformation of an envelope in a mechanical vibration.

First, there are methods of performing a filter process by a band pass filter (BPF), amplifying the amplitude, and the like so as to cancel the mechanical resonance characteristic in the turn around the b-axis of the deflection scan mirror 10 as a center, shown by the curve FS1 in FIG. 14.

In another method of suppressing deformation of the envelope in the mechanical vibration, a quality factor Q of the mechanical resonance characteristic in the turn around the b-axis of the deflection scan mirror 10 is set relatively low. The method using the quality factor Q will be briefly described below.

Generally, the quality factor Q of the resonance characteristic is roughly calculated by the following equation (1) using the mechanical resonance frequency fom in the turn around the b-axis of the deflection scan mirror 10 as a center and a frequency band (−3 dB passing frequency band) fb' in which decrease in the intensity of the frequency component by the mechanical resonance characteristic for the resonance frequency fom becomes 3 dB or less.

$$Q = fom/fb' \qquad (1)$$

When the frequency band $2fc$ of the side band is set within the −3 dB pass frequency band fb' in response to a demand of storing the side band, the following equation (2) is satisfied.

$$2fc = fb' \qquad (2)$$

Therefore, from the above equations (1) and (2), the relation of the following equation (3) is satisfied among the mechanical resonance frequency fom in the turn around the b-axis of the deflection scan mirror 10 as a center, the quality factor Q, and the frequency band fc of the correction signal.

$$fc = fom/(2Q) \qquad (3)$$

In the case where the frequency band fc of the correction signal is relatively wide (such as the case where distortion which is sharp with respect to time has to be corrected), the mechanical resonance frequency "fom" is almost determined by the standard of an image signal. Consequently, considering that the degree of freedom of increase is low, it is sufficient to decrease the quality factor Q to a small value, and widen the −3 dB pass frequency band fb' from the equation (1).

However, it is unpreferable to excessive decrease the quality factor Q for the reason that the resonance mechanical vibration is easily deformed by decrease in the sensitivity in resonance, disturbance, or the like. In such a case, therefore, it is sufficient to also employ the method using the above-described BPF, amplification, and the like.

By employing the circuit configuration in which the resonance bandwidth is widened, the driving of the deflection scan mirror 10 can be excellently traced to modulation of the amplitude of the drive signal.

Correction Item IV: Deformation in Vertical Scan Direction

At the time of horizontally scanning the screen SC with the spot of a laser beam, there is the case that a curve occurs such that a lateral line, that is, a scan line is arched. The curve in the scan line appears as distortion in the vertical scan direction in a projected image. In the following, the method of correcting distortion in the vertical scan direction will be described.

As the method of correcting distortion in the vertical scan direction, a method of correcting a curve in the scan line by properly adjusting the driving of the two-dimensional deflector 132 is considered. However, considering that the deflection scan mirror 10 turns at very high speed around the b-axis as a center, it is unrealistic to properly adjust a curve in a scan line by turn of the deflection scan mirror 10 around the a-axis as a center during the turn of the deflection scan mirror 10 around the b-axis as a center for realizing a horizontal scan on a single scan line. Moreover, the correction using the imaging process is unpreferable since it causes deterioration in resolution as described above.

Consequently, in the image projector 100 of the embodiment, by properly adjusting the shape of the projection optical system 131, distortion in the vertical scan direction is corrected, and a projected image with high resolution is realized.

More specifically, distortion in parts are corrected by using a free-form surface of the reflection faces of the first and second projection mirrors M1 and M2 of the projection optical system 131. It seems that employment of a free-form surface for the reflection faces of the first and second projection mirrors M1 and M2 causes slight increase in the manufacture cost of the image projector 100. However, for example, when the first and second projection mirrors M1 and M2 are generated as molded parts, the manufacture cost is lower than that of spherical parts formed by polishing.

The condition required for the projection optical system 131 is to excellently realize both of constant speed and high image forming performance in the entire area of a projected image. To satisfy the two requirements of constant speed and high image forming performance, when there is no flexibility in shape design such as the case where the shape of the screen SC is a plane, preferably, both of constant speed and high image forming performance is adjusted at least by two reflection mirrors. For this purpose, the image projector 100 of the embodiment has the first and second projection mirrors M1 and M2.

Concrete Example of Optical Mechanism

Table 1(A) to 1(D) show concrete examples of numerical values in the first embodiment.

TABLE 1(A)

| | face type | radius curvature (Y) | constant (Y) of cone | material | radius curvature (X) | constant (Y) of cone |
|---|---|---|---|---|---|---|
| light source | standard | infinite | | | | |
| lens incident face | standard | infinite | 0 | BK7 | | |
| lens outgoing face | XY curved surface | −6.568494506 | 0 | | −4.82427731 | 0 |
| (pupil) | standard | infinite | | | | |
| deflection scan mirror | standard | infinite | | mirror | | |
| first projection mirror | free-form surface | infinite | | mirror | | |
| second projection mirror | free-form surface | infinite | 0 | mirror | | 0 |
| screen | standard | infinite | | | | |

TABLE 1(B)

| | X | Y | Z | Tilt |
|---|---|---|---|---|
| light source | 0 | 0 | −28 | 0 |
| lens incident face | 0 | 0 | −18 | 0 |
| lens outgoing face | 0 | 0 | −15 | 0 |
| (pupil) | 0 | 0 | 0 | 0 |
| deflection scan mirror | 0 | 0 | 0 | −8.5 |
| first projection mirror | 0 | −7.736 | −5.566 | 18.269 |
| second projection mirror | 0 | −2.594 | 3.526 | 18.788 |
| screen | 0 | 125.224 | −384.353 | −1.281 |

Table 1 (C) shows the free-form surface data of the first and second projection mirrors M1 and M2. The free-form surface can be expressed by the following equation (4) employing the local coordinate system (X, Y, Z) using the surface vertex as the origin.

$$Z = (C0 \cdot H2) / \left[1 + \sqrt{\{1 - (1+K)C0^2 H2\}}\right] + \Sigma\{Ajk \cdot X^j \cdot Y^k\} \quad (4)$$

Where Z denotes a displacement amount (surface vertex reference) in the Z-axis direction at the position of height H, H denotes the height (H2=X2+Y2), C0 denotes the curvature at the surface vertex, K indicates the constant of the cone, and

TABLE 1(C)

| | coeffient | | | | | | | |
|---|---|---|---|---|---|---|---|---|
| | X2Y0 | X0Y2 | X0Y3 | X4Y0 | X2Y2 | X0Y4 | X2Y3 | X0Y5 |
| first projection mirror | 5.1072E−03 | 1.3285E−03 | −2.2824E−04 | 2.4469E−04 | −1.7398E−04 | 3.1747E−05 | 6.5112E−06 | −7.9873E−07 |
| second projection mirror | 3.4429E−02 | −1.4018E−03 | 1.0676E−04 | 1.7324E−04 | −1.8104E−04 | 3.8914E−06 | 4.7221E−06 | −5.5277E−08 |

TABLE 1(D)

| H scan mechanical angle | ±5.73 degrees | H-direction time utilization | 75% |
|---|---|---|---|
| V scan mechanical angle | ±7.50 degrees | V-direction time utilization | 80% |

In Table 1(A), "surface type", "radius curvature in the Y direction (radius curvature (Y), (unit:mm))", "constant of cone in the Y direction (constant (Y) of cone))", "material", "radius curvature in the X direction (radius curvature (X), (unit: mm))", and "constant of cone in the X direction (constant (X) of cone))" are shown with respect to the emission position of a laser beam of a laser device of each color as "object", "lens incident face", "lens outgoing face", "pupil", "deflection scan mirror 10" of the two-dimensional deflector 132, and the surfaces (optical surfaces) of the optical systems of "first projection mirror M1", "second projection mirror M2", and "screen SC" in the projection optical system 131.

In Table 1 (B), the coordinates of vertexes of each of the optical surfaces using the pupil as a reference are expressed by a global coordinate system (x, y, z), and the tilt angle (degrees) with respect to the X axis of the local coordinate system is shown for each of the optical surfaces.

Ajk indicates a free-form surface coefficient corresponding to the order "j" of X and the order "k" of Y. In Table 1 (C), for example, in X2Y0, the order "j" of X=2, and the order k of Y=0. The coefficient Ajk is 5.1072×10⁻³ (first projection mirror) and 3.4429×10⁻² (second projection mirror). The other coefficients are similar to the above.

Table 1 (D) shows the turn angle ranges in the horizontal and vertical scan directions of the two-dimensional deflector 132, that is, the scan angle ranges (H scan mechanical angle and V scan mechanical angle) and time utilization ratios (H-direction time utilization ratio and V-direction time utilization ratio).

Summary of Correcting Methods and Effects

The image projector 100 of the first embodiment performs, as shown in FIG. 15, the correction using the shape of the optical face of the projection optical system 131 (hereinafter, also called "optical correction") on fluctuations in scan speed in the horizontal scan direction and the distortion in the vertical scan direction. On the other hand, the image projector 100 performs the correction using the drive control of the two-dimensional deflector 132 (hereinafter, also called "deflection scan drive correction") on the distortion in the horizontal scan direction and fluctuations in scan speed in the vertical scan direction.

FIGS. 16A to 16C are diagrams schematically showing results of the optical correction and the deflection scan drive correction. In FIGS. 16A to 16C, points to be reproduced in a lattice in an image to be projected are indicated by filled circles. The filled circles are connected by lines along the horizontal scan lines and vertical scan lines. Concretely, FIG. 16A schematically shows an example of the state of an image projected onto the screen SC in the case where neither optical correction nor deflection scan drive correction is performed but resonant drive in the horizontal scan and linear drive in the vertical scan are simply performed by the two-dimensional deflector 132. FIG. 16B schematically shows an example of the state of an image projected onto the screen SC in the case where optical correction is performed on fluctuations in scan speed in the horizontal scan direction and distortion in the vertical scan direction. FIG. 16C schematically shows an example of the state of an image projected onto the screen SC in the case where optical correction is performed on fluctuations in scan speed in the horizontal scan direction and distortion in the vertical scan direction and, moreover, deflection scan drive correction is performed on distortion in the horizontal scan direction and fluctuations in scan speed in the vertical scan direction.

As shown in FIGS. 16A to 16C, by the optical correction and the deflection scan drive correction, the image projected on the screen SC is obtained with high resolution and free from distortion.

FIG. 17 schematically shows an example of the state of an image projected onto the screen SC in the case where optical correction is performed on fluctuations in scan speed in the horizontal scan direction and distortion in the vertical scan direction. FIG. 18 is a diagram showing a speed distribution of a horizontal scan on a horizontal scan line SL in the center of FIG. 17. In FIG. 18, the speed in an almost center portion of the horizontal scan line is normalized as a reference value 1. As shown in FIG. 18, fluctuations in the horizontal scanning speed are suppressed within ±10% irrespective of a position in the horizontal scan direction by the optical correction.

In the case where the optical correction is performed on the fluctuations in scan speed in the horizontal scan direction and the distortion in the vertical scan direction, as shown in the Table 1 (D), in spite of the fact that the time utilization ratio (H-direction time utilization ratio) in the horizontal scan direction of the two-dimensional deflector 132 is very high as 75%, fluctuations in the scan speed in the horizontal scan direction and distortion in the vertical scan direction are corrected excellently. Further, in the image projector 100 in the first embodiment, by performing the deflection scan drive correction on the scan speed in the vertical scan direction and distortion in the horizontal scan direction, a high-quality projection image with suppressed distortion and excellent resolution is obtained as also shown in FIG. 16C.

As described above, the image projector 100 of the first embodiment performs the correction of maintaining the scanning speed of a light flux almost constant in the horizontal scan direction on the screen SC and the correction of suppressing a distortion in an image in the vertical scan direction on the screen SC in accordance with the shape of the optical surface of the projection optical system 131. On the other hand, the image projector 100 performs the correction of maintaining the scanning speed of a light flux almost constant in the vertical scan direction on the screen SC by controlling a turn around the a-axis as a center in the deflection scan mirror 10 in the two-dimensional deflector 132 and the correction of suppressing a distortion in an image in the horizontal scan direction on the screen SC by controlling a turn around the b-axis as a center in the deflection scan mirror 10 in the two-dimensional deflector 132. By employing the deflection scan drive correction as described above, the projection optical system 131 can be miniaturized. While realizing small size, a high-quality image can be projected.

Second Embodiment

In the image projector 100 of the first embodiment, each time a laser beam is reflected, a light ray is split in the +y direction, and the deflection scan drive correction is employed as a method of correcting distortion in the horizontal scan direction. In contrast, in an image projector 100A in the second embodiment, the method of separating a light ray is different from that of the image projector 100 of the first embodiment, and optical correction is employed as a method of correcting distortion in the horizontal scan direction.

The image projector 100A of the second embodiment will be described below. The functional configuration of the image projector 100A of the second embodiment is similar to that of the image projector 100 of the first embodiment. The same reference numerals are designated to similar parts and the description will not be repeated. Different parts will be mainly described.

Configuration of Optical Mechanism

In the image projector 100A of the second embodiment, particularly, a projection optical system 131A is obtained by making the arrangement and the shape of the projection mirror of the projection optical system 131 in the optical mechanism 130 of the image projector 100 of the first embodiment different, thereby obtaining an optical mechanism 130A.

Figure 19:
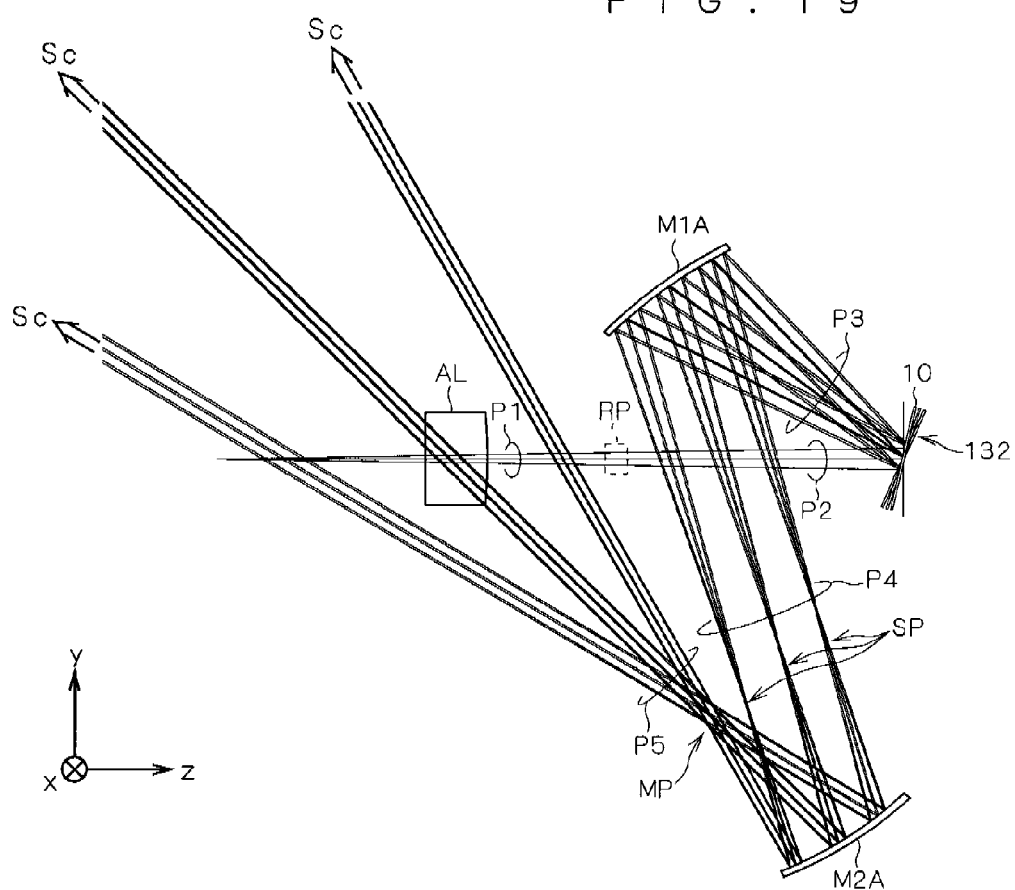
FIG. 19 is a diagram showing a schematic configuration of an optical mechanism according to a second embodiment.

FIG. 19 is a diagram showing a schematic configuration of the optical mechanism 130A. FIG. 19 is a schematic diagram when optical paths of light fluxes emitted from the light source 133 side toward the screen SC are viewed from a side. In FIG. 19, three orthogonal axes of x, y, and z are shown to clarify the azimuth relations. Although the optical paths are schematically shown in FIG. 19, in a manner similar to the first embodiment, the optical path on the light source 133 side is directed by a reflection mirror "Mr" in a direction perpendicular to the drawing sheet around a region RP (a region surrounded by broken line in the diagram) as shown in FIG. 5. In FIG. 19, the optical paths of light fluxes deflected at different three angles by turning of the deflection scan mirror 10 of the two-dimensional deflector 132 are shown for description purposes.

The optical mechanism 130 has, in order from the light source 133 side, laser devices of different colors (not shown), collimator lenses of the different colors (not shown), the prism DP, the anamorphic lens AL, the reflection mirror Mr, the two-dimensional deflector 132, a first projection mirror M1A, and a second projection mirror M2A.

As shown in FIG. 5, a light flux P1 emitted from an emission plane ALb is reflected by the reflection mirror Mr and the resultant light flux is incident on the two-dimensional deflector 132 as a light flux P2 whose emission direction is changed by about 90°.

In the two-dimensional deflector 132, the deflection scan mirror 10 is turned properly around two axes (a-axis and b-axis), thereby deflecting the light flux P2. The resultant light flux as a light flux P3 is incident on the first projection mirror M1A.

The projection optical system 131A is constructed by the first and second projection mirrors M1A and M2A. A light flux P3 from the two-dimensional deflector 132 is reflected by the first projection mirror M1A, thereby becoming a light flux P4 whose emission direction is changed. The light flux P4 is reflected by the second projection mirror M2A, thereby becoming a light flux P5 whose emission direction is changed. The light flux P5 is projected onto the screen SC.

The two-dimensional deflector 132, the first projection mirror M1A, and the second projection mirror M2A are disposed so as not to interrupt the reflected light fluxes so that light flux separation is carried out. More specifically, the two-dimensional deflector 132, the first projection mirror M1A, and the second projection mirror M2A are disposed so as to be deviated from each other in the direction along the short sides of an image, and the angles are also adjusted by the deviation amount.

As shown in FIG. 19, a light image (hereinafter, also called "light source image") SP formed in the same manner as that in the case where a laser beam is emitted from the light source 133 is set so as to exist on an optical path between the first and second projection mirrors M1A and M2A. A light image (hereinafter, also called "pupil image" or "MEMS image") MP formed in the same manner as that in the case where a laser beam is reflected by the deflection scan mirror 10 in the two-dimensional deflector 132 is set so as to exist on an optical path between the second projection mirror M2A and the screen SC.

Both of the first and second projection mirrors M1A and M2A have a free-form reflection surface having a positive power. A concrete shape of the free-form surface as the reflection surface will be described later.

More specifically, the reflection surface of each of the first and second projection mirrors M1A and M2A is constructed so that the positive power increases toward the periphery along the direction corresponding to the horizontal scan direction.

Figure 20:
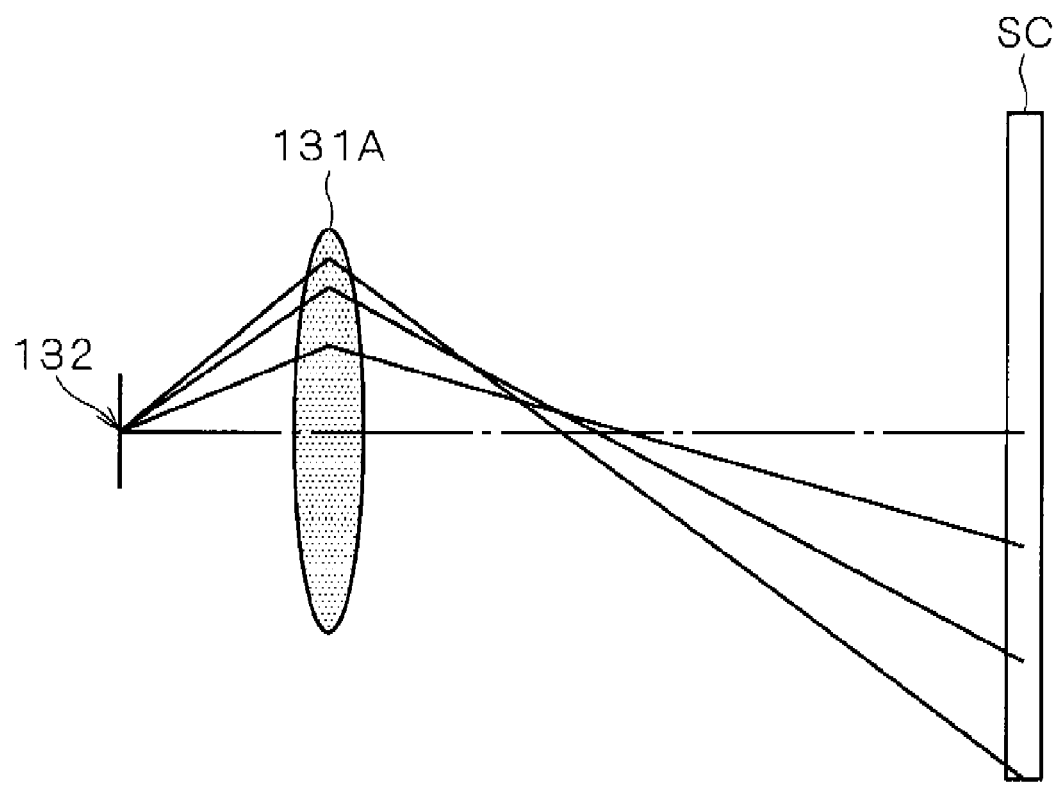
FIG. 20 is a diagram showing characteristics along a direction corresponding to the horizontal scan direction of a projection optical system.

FIG. 20 is a conceptual diagram showing the characteristics along the direction corresponding to the horizontal scan direction of the projection optical system 131A. In FIG. 20, optical paths in cross section along the horizontal scan direction from the two-dimensional deflector 132 to the screen SC are schematically shown. In reality, both of the two-dimensional deflector 132 and the projection optical system 131A are optical systems (reflecting optical systems) that reflect light. In FIG. 20, however, to simplify the drawing and description, they are shown as optical systems (transmissive optical systems) that transmit light.

As described above, in the case where the positive power increases toward the periphery along the direction corresponding to the horizontal scan direction of the projection optical system 131A, as shown in FIG. 20, a light beam incident on the projection optical system 131A is deflected more largely toward the periphery by the projection optical system 131A. As a result, although the angle of deflection per unit time of a laser beam by the two-dimensional deflector 132 corresponds to an unequal distance since the deflection scan mirror 10 is turned in the horizontal scan direction by the resonant drive, that is, sine wave drive, the angle of deflection per unit time of a laser beam becomes an equal distance by the properties of the projection optical system 132. On the screen SC, the laser beam scan speed becomes almost constant.

As shown in FIG. 19, in the image projector 100A of the second embodiment, the first and second projection mirrors M1A and M2A are disposed on the upper and lower sides (the positive and negative sides with respect to the y coordinate), respectively when viewed from the two-dimensional deflector 132. Consequently, a light flux incident on the two-dimensional deflector 132 and a light flux traveling from the first projection mirror M1A toward the second projection mirror M2A cross each other. By employing the configuration in which the light fluxes cross each other, the optical paths are formed by using the same space area twice. It can be therefore said that the volume of the space forming the optical path is efficiently used. Consequently, the optical mechanism 130A of the image projector 100A of the second embodiment can be made smaller than the optical mechanism 130 of the image projector 200 of the first embodiment. That is, it is preferable to employ the configuration in which the light fluxes cross each other in the optical mechanism to realize miniaturization of the optical mechanism and, further, miniaturization of the image projector.

As described above, an optical system (reflecting optical system) for reflecting light, constructed by the two-dimensional deflector 132 and the first and second projection mirrors M1A and M2A has to be disposed so as to separate the light beam separation. Since the two-dimensional deflector 132 deflects light from the light source 133 two-dimensionally, if the light flux is simply reflected from the two-dimensional deflector 132 to the second projection mirror M2A, the width of the light flux and the passage area of the light flux increase with distance from the two-dimensional deflector 132. Therefore, for example, in a projection optical system as employed in the embodiment of Japanese Patent Application Laid-Open No. 2006-178346, the light flux and the entire passage area of the light flux enlarge, so that the size of the optical system becomes large. To realize a small-sized projection optical system while using the reflecting optical system, as described above, preferably, the light source image SP exists in the optical path of the reflecting optical system, for example, in the optical path between the first and second projection mirrors M1A and M2A.

When a light source image in which a laser beam is converged exists in an optical path of the reflecting optical system, a light beam converges once and is narrowed in the part. With distance from the two-dimensional deflector 132, the width of the light flux and the passage area of the light flux do not increase. Therefore, the reflecting optical system for reflecting the light flux after formation of the light source image SP can be miniaturized. Concretely, the image projector 100A can realize miniaturization in the second projection mirror M2A. In addition, miniaturization in the optical mechanism 130A and the image projector 100A can be also preferably realized.

Correction of Distortion in Horizontal Scan Direction

The image projector 100A of the second embodiment employs the optical correction for correcting a distortion in the horizontal scan direction by devising the shape of the reflecting surface of the projection optical system 131A. To carry out the optical correction on a distortion in the horizontal scan direction, the first projection mirror M1A and/or the second projection mirror M2A have/has to employ a reflecting surface (free-form surface) in which the optical characteristic (concretely, the positive power) varies along the direction corresponding to the horizontal scan direction.

Concrete Example of Optical Mechanism

Concrete examples of numerical values in the second embodiment is shown in the following (Table 2(A) to 2(D)).

TABLE 2(A)

| | face type | radius curvature (Y) | constant (Y) of cone | material | radius curvature (X) | constant (Y) of cone |
|---|---|---|---|---|---|---|
| light source | standard | infinite | | | | |
| lens incident face | standard | infinite | 0 | BK7 | | |
| lens outgoing face | XY Curved surface | −22.40735 | 0 | | −5.1504627 | 0 |
| (pupil) | standard | infinite | | | | |
| deflection scan mirror | standard | infinite | | mirror | | |
| first projection mirror | free-form surface | infinite | | mirror | | |
| second projection mirror | free-form surface | infinite | 0 | mirror | | 0 |
| screen | standard | infinite | | | | |

TABLE 2(B)

| | X | Y | Z | Tilt |
|---|---|---|---|---|
| light source | 0 | 0 | −33 | 0 |
| lens incident face | 0 | 0 | −23 | 0 |
| lens outgoing face | 0 | 0 | −20 | 0 |
| (pupil) | 0 | 0 | 0 | 0 |
| deflection scan mirror | 0 | 0 | 0 | −18 |
| first projection mirror | 0 | 10.926 | −6.647 | −65.602 |
| second projection mirror | 0 | −15.383 | 0.829 | −44 |
| screen | 0 | 259.725 | −290.465 | −76.986 |

In Table 2(A), like Table 1(A), "surface type", "radius curvature in the Y direction (radius curvature (Y), (unit:mm))", "constant of cone in the Y direction (constant (Y) of cone))", "material", "radius curvature in the X direction (radius curvature (X), (unit:mm))", and "constant of cone in the X direction (constant (X) of cone))" are shown with respect to optical surfaces of "object", "lens incident face", "lens outgoing face", "pupil", "deflection scan mirror 10" of the two-dimensional deflector 132, "first projection mirror M1A", "second projection mirror M2A", and "screen SC".

In Table 2 (B), the coordinates of vertexes of each of the optical surfaces using the pupil as a reference are expressed by a global coordinate system (x, y, z), and the tilt angle

TABLE 2(C)

| | coefficient | | | | | | | |
|---|---|---|---|---|---|---|---|---|
| | X2Y0 | X0Y2 | X0Y3 | X4Y0 | X2Y2 | X0Y4 | X2Y3 | X0Y5 |
| first projection mirror | 5.8246E−03 | 1.7990E−02 | 2.3416E−04 | 2.3873E−04 | −1.6476E−04 | 9.8447E−05 | −3.1342E−05 | 1.2074E−05 |

| | coefficient | | | | | | |
|---|---|---|---|---|---|---|---|
| | X6Y0 | X4Y2 | X2Y4 | X0Y6 | X4Y3 | X2Y5 | X0Y7 |
| first projection mirror | −3.1938E−05 | 1.4680E−05 | −3.2738E−06 | 5.0256E−07 | 1.2129E−06 | −1.7277E−07 | 1.3903E−09 |

| | coefficient | | | | | | | |
|---|---|---|---|---|---|---|---|---|
| | X2Y0 | X0Y2 | X0Y3 | X4Y0 | X2Y2 | X0Y4 | X2Y3 | X0Y5 |
| second projection mirror | −1.5443E−02 | −2.4701E−02 | 3.0196E−04 | −1.1202E−04 | −6.1758E−04 | 5.2408E−05 | −1.3291E−04 | −4.5645E−06 |

| | coefficient | | | | | | |
|---|---|---|---|---|---|---|---|
| | X6Y0 | X4Y2 | X2Y4 | X0Y6 | X4Y3 | X2Y5 | X0Y7 |
| second projection mirror | −2.8307E−07 | 2.7091E−06 | −1.4624E−05 | −2.3408E−06 | 2.3187E−07 | −6.2742E−07 | −1.2882E−07 |

TABLE 2(D)

| H scan mechanical angle | ±5.73 degrees | H-direction time utilization | 75% |
|---|---|---|---|
| V scan mechanical angle | ±6.00 degrees | V-direction time utilization | 80% |

(degrees) with respect to the X axis of the local coordinate system is shown for each of the optical surfaces.

Table 2 (C) shows, like Table 1 (C), the free-form surface data of the first and second projection mirrors M1A and M2A.

Table 2 (D) shows, like Table 1 (D), the turn angle ranges in the horizontal and vertical scan directions of the two-dimensional deflector 132, that is, the scan angle ranges (H scan mechanical angle and V scan mechanical angle) and time utilization ratios (H-direction time utilization ratio and V-direction time utilization ratio).

Summary of Correcting Methods and Effects

The image projector 100A of the second embodiment performs, as shown in FIG. 21, correction (optical correction) using the shape of the optical surface of the projection optical system 131A on fluctuations in scan speed in the horizontal scan direction, distortion in the vertical scan direction, and distortion in the horizontal scan direction. On the other hand, the image projector 100A performs correction using the drive control of the two-dimensional deflector 132 (deflection scan drive correction) on the fluctuations in scan speed in the vertical scan direction.

FIG. 22 is a diagram schematically showing a result of the optical correction. In FIG. 22, points to be reproduced in a lattice in an image to be projected are indicated by filled circles. The filled circles are connected by lines along the horizontal scan lines and vertical scan lines. As shown in FIG. 22, by the optical correction, the image projected on the screen SC is obtained with high resolution and free from distortion except for fluctuations in scan speed in the vertical scan direction.

Figure 23:
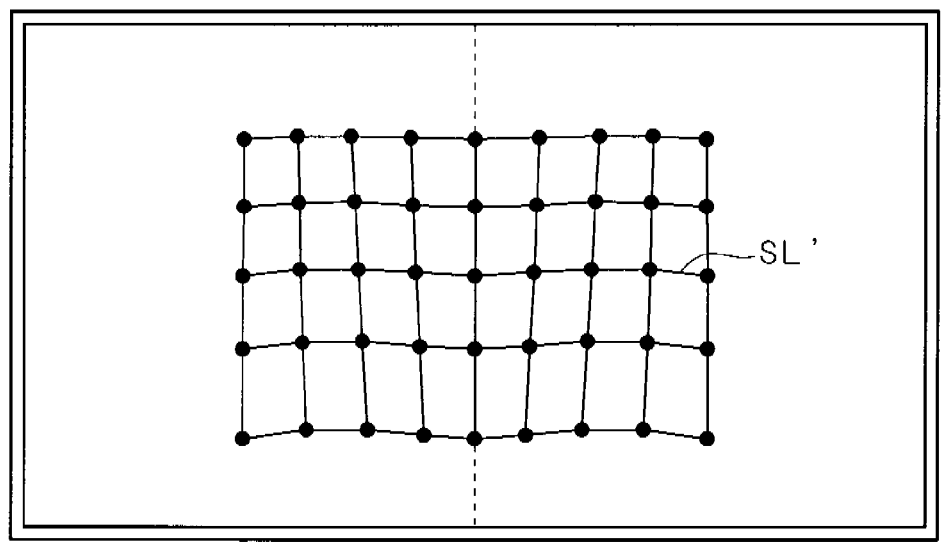
FIG. 23 is a schematic diagram illustrating a state of a projection image.
Figure 24:
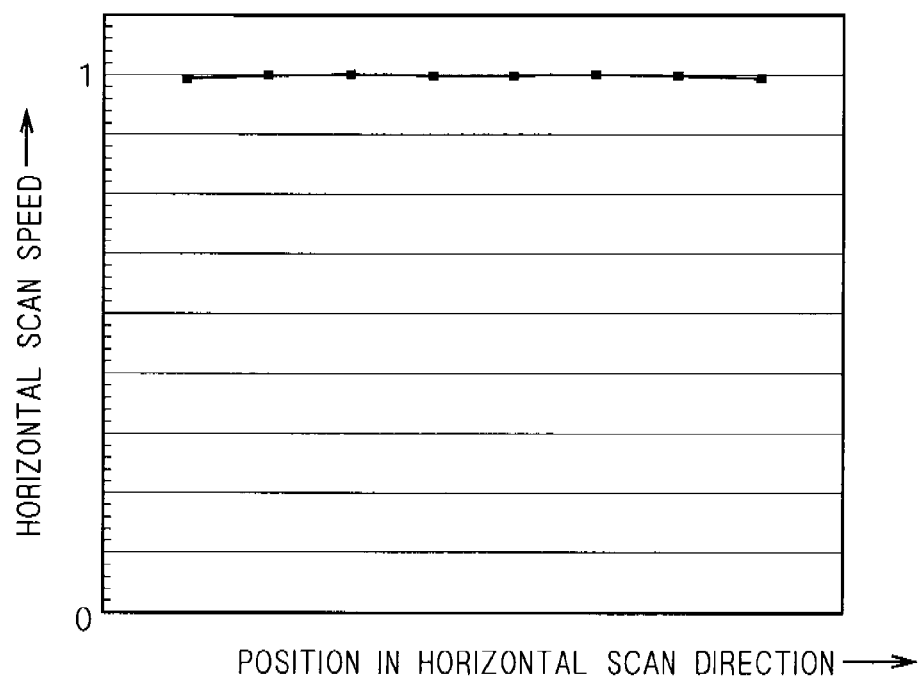
FIG. 24 is a diagram showing a speed distribution of horizontal scan on a horizontal scan line.

FIG. 23 schematically shows an example of the state of an image projected onto the screen SC in the case where optical correction is performed on fluctuations in scan speed in the horizontal scan direction, distortion in the vertical scan direction, and distortion in the horizontal scan direction under a certain condition. FIG. 24 is a diagram showing a speed distribution of a horizontal scan on a horizontal scan line SL' in the center of FIG. 23. The speed in an almost center of a horizontal scan line is normalized as a reference value 1. As shown in FIG. 24, fluctuations in the horizontal scanning speed are suppressed to an almost ignorable extent irrespective of a position in the horizontal scan direction by the optical correction.

Also in the case where the optical correction is performed on the fluctuations in scan speed in the horizontal scan direction, the distortion in the vertical scan direction, and the distortion in the horizontal scan direction, as shown in the Table 2 (D), in spite of the fact that the time utilization ratio (H-direction time utilization ratio) in the horizontal scan direction of the two-dimensional deflector 132 is very high as 75%, the fluctuations in scan speed in the horizontal scan direction and distortions in the vertical and horizontal scan directions are corrected excellently. Further, in the image projector 100A in the second embodiment, by performing the deflection scan drive correction on the fluctuations in scan speed in the vertical scan direction, a high-quality projection image with suppressed distortion and excellent resolution is obtained as also shown in FIG. 16C.

As described above, the image projector 100A of the second embodiment performs the correction of maintaining the scanning speed of a light flux almost constant in the horizontal scan direction on the screen SC, the correction of suppressing a distortion in a projected image in the vertical scan direction on the screen SC, and the correction of suppressing a distortion in a projected image in the horizontal scan direction by devising the shape of the optical surface of the projection optical system 131A. On the other hand, the image projector 100A performs the correction of maintaining the scanning speed of a light flux almost constant in the vertical scan direction on the screen SC by controlling a turn around the a-axis as a center in the deflection scan mirror 10 in the two-dimensional deflector 132. By employing the deflection scan drive correction as described above, the projection optical system 131A can be miniaturized. While realizing small size, a high-quality image can be projected.

Modifications

Although the embodiments of the present invention have been described above, the invention is not limited to the above description.

For example, in the first embodiment, the deflection scan drive correction is employed for both of the correction on distortion in the horizontal scan direction and the correction on fluctuations in scan speed in the vertical scan direction. In the second embodiment, the deflection scan drive correction is employed only for correction on fluctuations in scan speed in the vertical scan direction out of the correction on the distortion in the horizontal scan direction and fluctuations in the scan speed in the vertical scan direction. However, the invention is not limited to the embodiments. For example, by employing the deflection scan drive correction on either distortion in the horizontal scan direction or fluctuations in scan speed in the vertical scan direction, miniaturization of the projection optical system and, further, miniaturization of the image projector can be realized. From the viewpoints of simplifying the shape of the projection optical system and realizing miniaturization of the projection optical system and the image projector, it is more preferable to employ the deflection scan drive correction for both of correction on the distortion in the horizontal scan direction and correction on fluctuations in scan speed in the vertical scan direction.

In the foregoing embodiments, with respect to the vertical scan direction, drawing is performed simply by a scan in one direction. However, the invention is not limited to the embodiments. Also with respect to the vertical scan direction, drawing may be performed using both ways of a turn of the deflection scan mirror 10 in a manner similar to the scan in the horizontal scan direction. In the case of employing such a configuration, the basic waveform of a drive signal for realizing turn of the deflection scan mirror 10 in the vertical scan is not a saw-tooth shape but is a triangular shape.

Also in the image projector 100 of the first embodiment, it is more preferable to employ the configuration in which light fluxes cross each other in the reflecting optical system like in the image projector 100A of the second embodiment, from the viewpoint of realizing miniaturization of the optical mechanism 130 and, further, the image projector 100.

In the foregoing embodiments, the light source 133 generates laser beams of three colors of R, G, and B. The invention is not limited to the embodiments. Since the case where a projected image is expressed in one or more arbitrary colors is assumed, it is sufficient for the light source 133 to generate a laser beam of one or more colors. In the case where a projected image is made of pixels having constant brightness, it is unnecessary to modulate an output in the light source 133.

In the foregoing embodiments, envelope is simply given to the waveform of a drive signal in the deflection scan drive correction on distortion in the horizontal scan direction. However, the invention is not limited to the embodiments. Since various distortions including not only a so-called trapezoidal distortion but also a bobbin-shaped distortion exist in projected images caused by a distortion in the horizontal scan direction, it is sufficient to properly vary the amplitude of the sine-wave drive signal for repetitively turning the deflection scan mirror 10 around the b-axis as a center in a display period of an image of each frame in accordance with the kind of the distortion.

In the foregoing embodiments, the single reflector 10 is turned around the two axes (a-axis and b-axis) which almost perpendicularly cross each other as centers in the two-dimensional deflector 132, thereby deflecting a light flux from the light source 133 so as to be reflected two-dimensionally. The invention is not limited to the configuration. It is also possible to deflect the light flux from the light source 133 so as to be reflected two-dimensionally by realizing deflection of a light flux in one direction and deflection of a light flux in the other direction by turning two reflectors separately provided. As a concrete example of such a configuration, a first deflector in which a reflector can be turned around an a'-axis as a center and a second deflector in which a reflector can be turned around a b'-axis as a center are disposed in order in an optical path extending from the light source 133 to the screen SC. To realize horizontal and vertical scans, preferably, the a'-axis and the b'-axis are set so as to be orthogonal to a line in the optical path extending from the light source 133 to the screen SC (preferably, a line in the center, that is, the center line of the optical path). The a'-axis and the b'-axis are set apart from each other by a predetermined distance along the center line of the optical path and are turned by about 90° around the center line of the optical path as a center. In other words, the b'-axis is preferably apart from the a'-axis as a reference by a predetermined distance along a predetermined straight line almost perpendicular to the a'-axis and turned by about 90° around the predetermined straight line as a center.

While the invention has been shown and described in detail, the foregoing description is in all aspects illustrative and not restrictive. It is therefore understood that numerous modifications and variations can be devised without departing from the scope of the invention.

What is claimed is:

1. An image projector for projecting an image onto a projection plane, comprising:
    a casing;
    a light source mounted to the casing;
    a deflector having a reflector for reflecting a light flux emitted from said light source and two-dimensionally deflecting said light flux by turning said reflector around a first axis as a center and turning said reflector around a second axis as a center, the second axis almost orthogonal to said first axis, wherein the reflector is planar in shape and substantially rectangular with a pair of edges thereof substantially parallel to the first axis and a pair of edges substantially parallel to the second axis, said deflector comprising:
        a pair of torsion bars each connected at a first end to opposite edges of the reflector, the torsion bars extending along the second axis,
        a movable planar frame formed of four plate parts and having an aperture in which the reflector is positioned, the movable planar frame being substantially rectangular in shape with diagonals along the first and second axes, a second end of the torsion bars being connected within the aperture to opposite inner corners of the four plate parts of the movable planar frame, the movable planar frame having a coupling element at two outer corners along the first axis,
        four piezoelectric elements disposed around the movable planar frame, the piezoelectric elements being operative so that upon application of a voltage thereto their lengths change, a first piezoelectric element being attached at a first end to a first coupling element of the movable planar frame, a second piezoelectric element being attached at a first end to the first coupling element of the movable planar frame, a third piezoelectric element being attached at a first end to a second coupling element of the movable planar frame, a fourth piezoelectric element being attached at a first end to the second coupling element of the movable planar frame,
        a fixed planar frame mounted to the casing and formed of four plate parts and having an aperture in which the four piezoelectric elements are positioned, the fixed planar frame being substantially rectangular in shape with diagonals along the first and second axes, a second end of the first piezoelectric element being attached to a first inner corner of the fixed planar frame disposed on the second axis, a second end of the second piezoelectric element being attached to a second inner corner of the fixed planar frame disposed on the second axis, a second end of the third piezoelectric element being attached to the second corner of the fixed planar frame disposed on the second axis, a second end of the fourth piezoelectric element being attached to the first inner corner of the fixed planar frame disposed on the second axis;
    a deflection controller for controlling said piezoelectric elements to cause the reflector to turn around said second axis as a center by resonant drive and to turn around said first axis as a center by non-resonant drive; and
    a projection optical system for projecting said image onto said projection plane by guiding the light flux deflected by said deflector onto said projection plane, the projection optical system having one or more optical surfaces,
    wherein a shape of one or more optical surfaces of said projection optical system includes a shape for performing a one-scan-direction scan speed correction for maintaining scanning speed of said light flux along one scan direction on said projection plane almost constant and a shape for performing an other-scan-direction distortion correction for suppressing a distortion in an image along the other scan direction almost orthogonal to said one scan direction on said projection plane, and
    wherein said deflection controller performs at least one of an other-scan-direction scan speed correction for maintaining scanning speed of said light flux along said other scan direction on said projection plane almost constant by controlling a turn of said reflector around said first axis as a center, and a one-scan-direction distortion correction for suppressing a distortion in an image along said one scan direction on said projection plane by controlling a turn of said reflector around said second axis as a center.

2. The image projector according to claim 1, wherein said deflection controller performs said other-scan-direction scan speed correction by adjusting a drive signal for turning said reflector around said first axis as a center in a display period of an image of each frame.

3. The image projector according to claim 2, wherein said deflection controller performs said other-scan-direction scan speed correction by adjusting a waveform of a drive signal for turning said reflector around said first axis as a center to a nonlinear shape in a display period of an image of each frame.

4. The image projector according to claim 1, wherein said deflection controller performs said other-scan-direction scan speed correction by adjusting a drive signal for turning said reflector around said first axis as a center by a correction signal in a display period of an image of each frame.

5. The image projector according to claim 1, wherein said deflection controller performs said one-scan-direction distortion correction by varying an amplitude of a drive signal for repetitively turning said reflector around said second axis as a center in a display period of an image of each frame.

6. The image projector according to claim 1, wherein said deflection controller controls so as to perform said other-scan-direction scan speed correction.

7. The image projector according to claim 1, wherein said deflection controller controls so as to perform said one-scan-direction distortion correction.

8. The image projector according to claim 1, wherein said deflection controller controls so as to perform both of said other-scan-direction scan speed correction and said one-scan-direction distortion correction.

9. The image projector according to claim 1, wherein said projection optical system includes a first optical plane having a shape for performing said one-scan-direction scan speed correction and a second optical plane having a shape for performing said other-scan-direction distortion correction.

10. An image projector for projecting an image onto a projection plane, comprising:
a casing;
a light source mounted to the casing;
a deflector having a reflector for reflecting a light flux emitted from said light source and two-dimensionally deflecting said light flux by turning said reflector around a first axis as a center and turning said reflector around a second axis as a center, the second axis almost orthogonal to said first axis, wherein the reflector is planar in shape and substantially rectangular with a pair of edges thereof substantially parallel to the first axis and a pair of edges substantially parallel to the second axis, said deflector comprising:
a pair of torsion bars each connected at a first end to opposite edges of the reflector, the torsion bars extending along the second axis,
a movable planar frame formed of four plate parts and having an aperture in which the reflector is positioned, the movable planar frame being substantially rectangular in shape with diagonals along the first and second axes, a second end of the torsion bars being connected within the aperture to opposite inner corners of the four plate parts of the movable planar frame, the movable planar frame having a coupling element at two outer corners along the first axis,
four piezoelectric elements disposed around the movable planar frame, the piezoelectric elements being operative so that upon application of a voltage thereto their lengths change, a first piezoelectric element being attached at a first end to a first coupling element of the movable planar frame, a second piezoelectric element being attached at a first end to the first coupling element of the movable planar frame, a third piezoelectric element being attached at a first end to a second coupling element of the movable planar frame, a fourth piezoelectric element being attached at a first end to the second coupling element of the movable planar frame,
a fixed planar frame mounted to the casing and formed of four plate parts and having an aperture in which the four piezoelectric elements are positioned, the fixed planar frame being substantially rectangular in shape with diagonals along the first and second axes, a second end of the first piezoelectric element being attached to a first inner corner of the fixed planar frame disposed on the second axis, a second end of the second piezoelectric element being attached to a second inner corner of the fixed planar frame disposed on the second axis, a second end of the third piezoelectric element being attached to the second corner of the fixed planar frame disposed on the second axis, a second end of the fourth piezoelectric element being attached to the first inner corner of the fixed planar frame disposed on the second axis;
a deflection controller for controlling said piezoelectric elements to cause the reflector to turn around said first axis as a center and to turn around said second axis as a center; and
a projection optical system for projecting said image onto said projection plane by guiding the light flux deflected by said deflector onto said projection plane, the projection optical system having at least one optical surface,
wherein one of a one-scan-direction distortion correction for suppressing a distortion in an image along one scan direction on said projection plane and a one-scan-direction scan speed correction for maintaining scanning speed of said light flux along said one scan direction on said projection plane almost constant is performed by using a shape of at least one optical surface in said projection optical system, the other correction is performed by controlling a turn of said reflector by said deflection controller, and
wherein one of an other-scan-direction distortion correction for suppressing a distortion in an image along the other scan direction almost orthogonal to said one scan direction on said projection plane and an other-scan-direction scan speed correction for maintaining scanning speed of said light flux along said other scan direction on said projection plane almost constant is performed by using a shape of at least one optical surface in said projection optical system, and the other correction is performed by controlling a turn of said reflector by said deflection controller.

11. An image projector for projecting an image onto a projection plane, comprising:
a casing;
a light source mounted to the casing;
a deflector having a reflector for reflecting a light flux emitted from said light source and two-dimensionally deflecting said light flux by turning said reflector around a first axis as a center and turning said reflector around a second axis as a center, the second axis almost orthogonal to said first axis, wherein the reflector is planar in shape and substantially rectangular with a pair of edges thereof substantially parallel to the first axis and a pair of edges substantially parallel to the second axis, said deflector comprising:
a pair of torsion bars each connected at a first end to opposite edges of the reflector, the torsion bars extending along the second axis,
a movable planar frame having an aperture in which the reflector is positioned, the movable planar frame being substantially rectangular in shape, a second end of the torsion bars being connected within the aperture to opposite parts of the movable planar frame, the movable planar frame having a coupling element at two parts along the first axis,
an actuator configured to operate the movable planar frame so that the movable planar frame turns around a first axis with the reflector in the aperture and the reflector turns in the aperture around a second axis when the movable planar frame turns around a second axis,
a deflection controller for controlling said actuator to cause the reflector to turn around said second axis as a center by resonant drive and to turn around said first axis as a center by non-resonant drive; and
a projection optical system for projecting said image onto said projection plane by guiding the light flux deflected by said deflector onto said projection plane, the projection optical system having one or more optical surfaces, wherein a shape of one or more optical surfaces of said projection optical system includes a shape for performing a one-scan-direction scan speed correction for maintaining scanning speed of said light flux along one scan direction on said projection plane almost constant and a shape for performing an other-scan-direction distortion correction for suppressing a distortion in an image along the other scan direction almost orthogonal to said one scan direction on said projection plane, and wherein said deflection controller performs at least one of an other-scan-direction scan speed correction for maintaining scanning speed of said light flux along said other scan direction on said projection plane almost constant by controlling a turn of said reflector around said first axis as a center, and a one-scan-direction distortion correction for suppressing a distortion in an image along said one scan direction on said projection plane by controlling a turn of said reflector around said second axis as a center.

* * * * *